(12) United States Patent
Kuge

(10) Patent No.: US 12,133,072 B2
(45) Date of Patent: Oct. 29, 2024

(54) USER EQUIPMENT (UE)

(71) Applicant: SHARP KABUSHIKI KAISHA, Sakai (JP)

(72) Inventor: Yoko Kuge, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 385 days.

(21) Appl. No.: 17/772,492

(22) PCT Filed: Oct. 29, 2020

(86) PCT No.: PCT/JP2020/040713
§ 371 (c)(1),
(2) Date: Apr. 27, 2022

(87) PCT Pub. No.: WO2021/085568
PCT Pub. Date: May 6, 2021

(65) Prior Publication Data
US 2022/0345885 A1 Oct. 27, 2022

(30) Foreign Application Priority Data

Oct. 31, 2019 (JP) ................................ 2019-198571

(51) Int. Cl.
*H04W 12/06* (2021.01)
*H04W 60/00* (2009.01)
(Continued)

(52) U.S. Cl.
CPC ........... *H04W 12/06* (2013.01); *H04W 60/00* (2013.01); *H04W 60/06* (2013.01); *H04W 84/042* (2013.01)

(58) Field of Classification Search
CPC ...... H04W 12/06; H04W 60/00; H04W 60/06
See application file for complete search history.

(56) References Cited

U.S. PATENT DOCUMENTS

2011/0117914 A1 5/2011 Yang et al.
2019/0029065 A1* 1/2019 Park ..................... H04W 8/08
(Continued)

FOREIGN PATENT DOCUMENTS

JP 2017017451 A 1/2017
KR 20110052471 A 5/2011

OTHER PUBLICATIONS

"3rd Generation Partnership Project; Technical Specification Group Services and System Aspects; System Architecture for the 5G System; Stage 2(Release 16)", 3GPP TS 23.501 V16.1.0 (Jun. 2019).

(Continued)

*Primary Examiner* — Kevin C. Harper
(74) *Attorney, Agent, or Firm* — ScienBiziP, P.C.

(57) ABSTRACT

According to an aspect of the present invention, a procedure for initial registration of a UE and a procedure for periodic registration or registration based on movement, and a communication unit are provided which are used to implement Network Slice Specific Authentication and Authorization in 5GS. Furthermore, by providing the Network Slice Specific Authentication and Authorization initiated by a network, a procedure for changing UE configurations initiated by the network, the procedure being initiated based on completion of the Network Slice Specific Authentication and Authorization, a de-registration procedure initiated by the network, and a communication unit, a communication unit is provided that is used to implement functions related to the Network Slice Specific Authentication and Authorization in the 5GS.

3 Claims, 9 Drawing Sheets

(51) Int. Cl.
*H04W 60/06* (2009.01)
*H04W 84/04* (2009.01)

(56) References Cited

U.S. PATENT DOCUMENTS

| | | | |
|---|---|---|---|
| 2020/0229079 A1* | 7/2020 | Lee | H04W 48/02 |
| 2021/0051566 A1* | 2/2021 | Tiwari | H04W 48/02 |
| 2022/0286953 A1* | 9/2022 | Long | H04W 12/06 |

OTHER PUBLICATIONS

"3rd Generation Partnership Project; Technical Specification Group Services and System Aspects; Procedures for the 5G System; Stage 2(Release 16)", 3GPP TS 23.502 V16.1.1 (Jun. 2019).
"3rd Generation Partnership Project; Technical Specification Group Core Network and Terminals; Non-Access-Stratum (NAS) protocol for 5G System (5GS); Stage 3(Release 16)", 3GPP TS 24.501 V16.2.0 (Sep. 2019).
"3rd Generation Partnership Project; Technical Specification Group Core Network and Terminals; Non-Access-Stratum (NAS) protocol for 5G System (5GS); Stage 3(Release 16)", 3GPP TS 24.501 V16.4.0 (Mar. 2020), pp. 72-78, 208-236, 553-554.
Ericsson, "NW slice authentication and authorization failure and revocation", C1-196187, 3GPP TSG-CT WG1 Meeting #120 Portoroz (Slovenia), Oct. 7-11, 2019.
Vivo et al., "Deregistration due to the failed network Slice-Specific Authentication and Authorization", C1-196568 (was C1-196171), 3GPP TSG-CT WG1 Meeting #120 Portoroz (Slovenia), Oct. 7-11, 2019.

\* cited by examiner

USER EQUIPMENT (UE)

TECHNICAL FIELD

This application relates to a User Equipment (UE). This application claims the benefit of priority to JP 2019-198571 filed on Oct. 31, 2019, which is incorporated herein by reference in its entirety.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE).

Additionally, the 3GPP has recently studied next-generation communication technologies and system architectures for a 5th Generation (5G) mobile communication system which is a next generation mobile communication system, and in particular, has standardized a 5G System (5GS) as a system for realizing a 5G mobile communication system (see NPL 1 and NPL 2). In the 5GS, technical problems attributable to connection of various terminals to a cellular network are extracted to standardize solutions.

CITATION LIST

Non Patent Literature

NPL 1: 3GPP TS 23.501 V16.1.0 (2019-06); 3rd Generation Partnership Project; Technical Specification Group Services and System Aspects; System Architecture for the 5G System; Stage 2 (Release 16)

NPL 2: 3GPP TS 23.502 V16.1.1 (2019-06); 3rd Generation Partnership Project; Technical Specification Group Services and System Aspects; Procedures for the 5G System; Stage 2 (Release 16)

NPL 3: 3GPP TS 24.501 V16.2.0 (2019-09); 3rd Generation Partnership Project; Technical Specification Group Core Network and Terminals; Non-Access-Stratum (NAS) protocol for 5G System (5GS); Stage 3 (Release 16)

SUMMARY OF INVENTION

Technical Problem

For the 5G System (5GS), a 5G Core Network (5GCN) corresponding to a new core network has been under study in order to provide a wide variety of services.

In addition, in 5G, a network slice has been defined that corresponds to a logical network that provides specific network functions and specific network characteristics for a specific service type or a specific group. For example, the network slice may be a logical network provided for terminals with a low delay function, or may be a logical network provided for sensor terminals used in Internet of Things (IoT).

In 3GPP, Enhancement of Network Slicing (eNS) has been under study in order to examine further functions associated with network slices. Furthermore, for eNS, Network Slice-specific Authentication and Authorization has been under study in which an authentication procedure is performed for each network slice, in addition to a known authentication procedure for each UE.

Studies have been conducted about a response by a network to a UE in a case that the UE requests, in a registration request, to be allowed to connect to a network slice requiring the Network Slice-specific Authentication and Authorization, the response being made in a state in which notification of determination of whether the network slice requested by the UE is an allowed slice or a rejected slice is made pending.

However, no specific means or methods have been clarified in which in the network slice pending state, the UE and the network manage information related to the pending network slice.

In the light of the circumstances as described above, an object of the present invention is to provide a method of implementing a function for eNS in the 5GS.

Solution to Problem

An embodiment of the present invention provides a User Equipment (UE) including a controller and a storage unit, wherein the controller stores first rejected NSSAI rejected due to failed or revoked network slice-specific authentication and authorization, the controller transitions from a registered state to a deregistered state for a current PLMN both on a first access and a second access, and the storage unit deletes the first rejected NSSAI.

Advantageous Effects of Invention

According to an aspect of the present invention, in the 5GS, eNS can be supported, and the Network Slice-specific Authentication and Authorization can be supported. Furthermore, the UE supporting the Network Slice-specific Authentication and Authorization can be registered with the core network supporting the Network Slice-specific Authentication and Authorization.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. Overview of System

Figure 1:
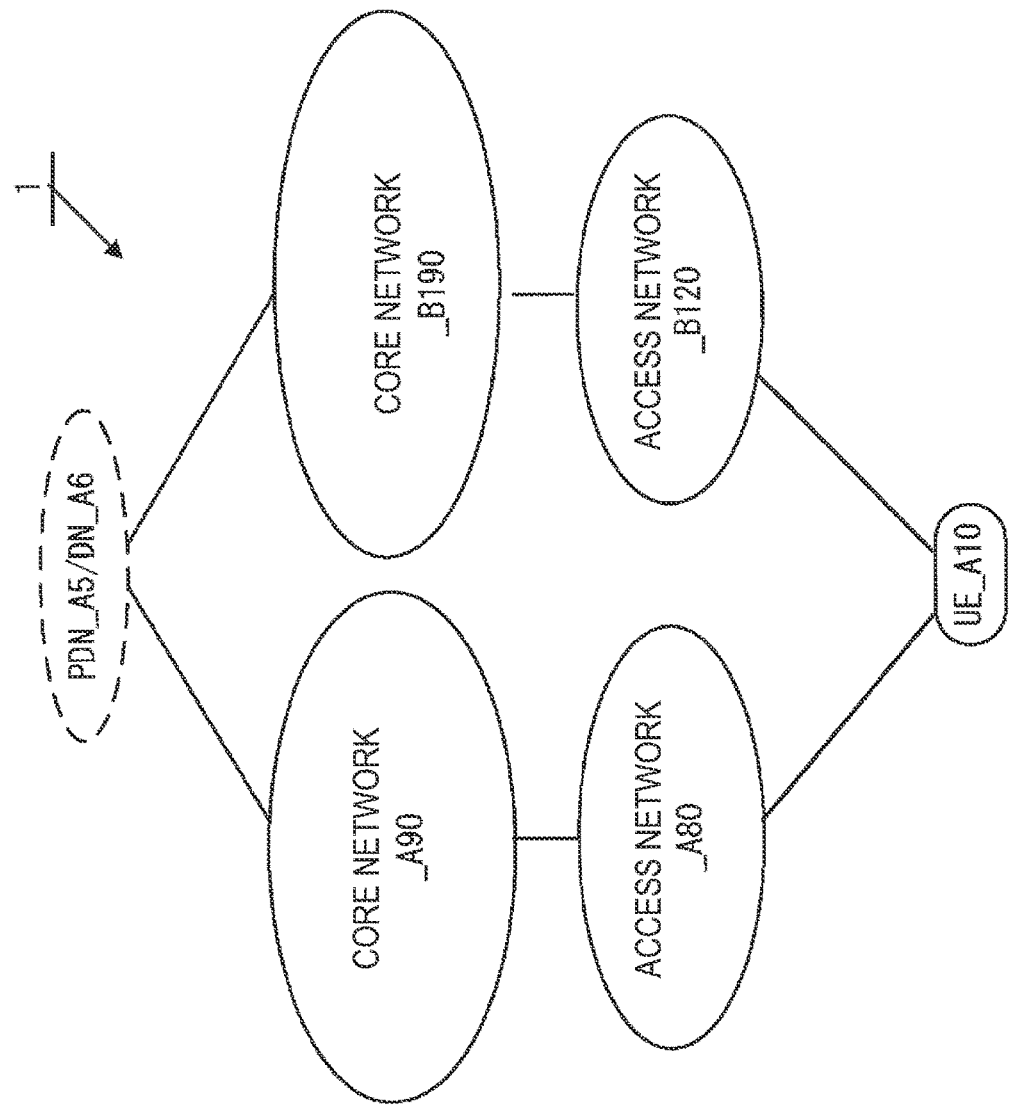
FIG. 1 is a diagram illustrating an overview of a mobile communication system (EPS/5GS).
Figure 2:
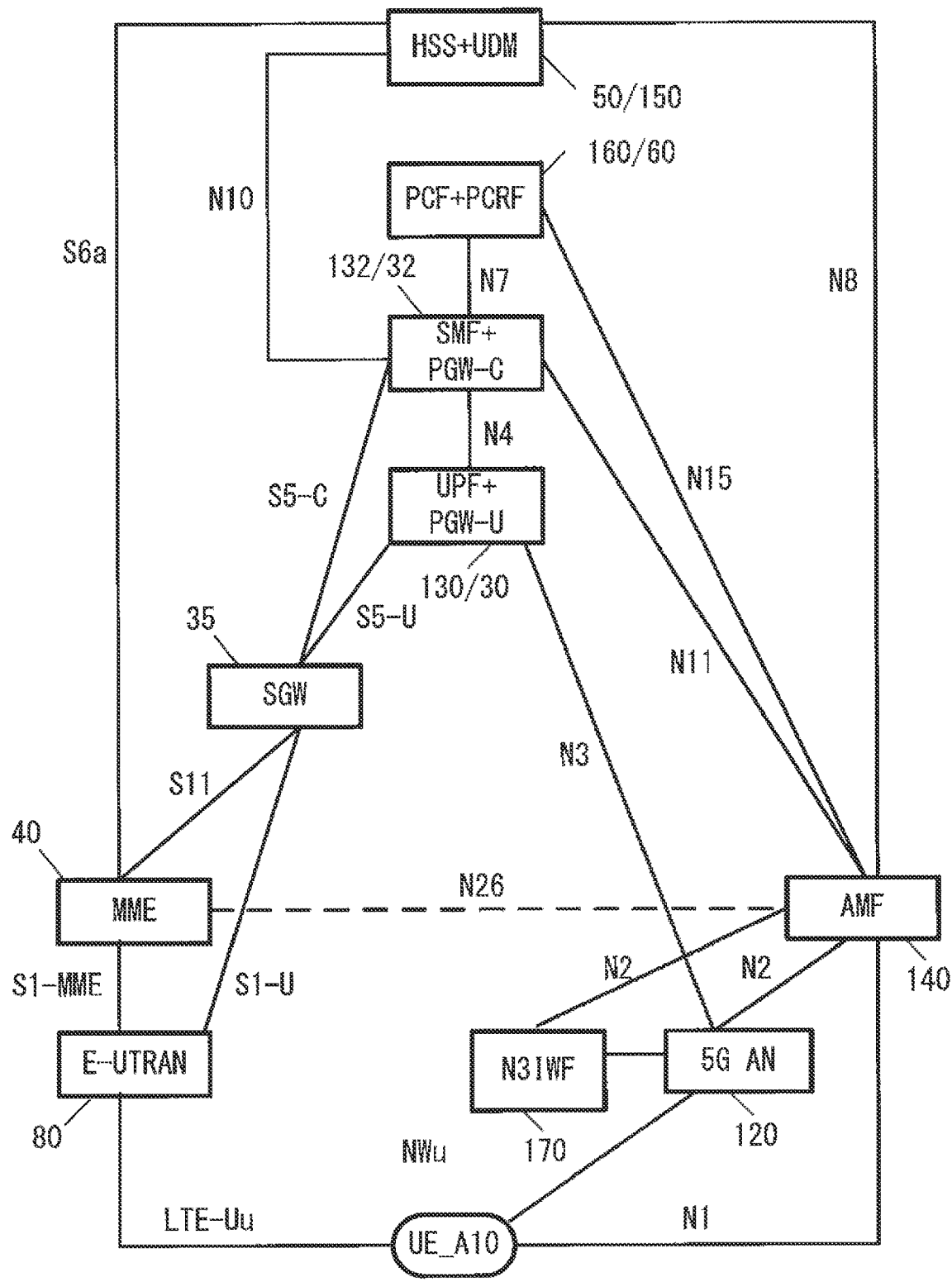
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

In the illustration of FIG. 1, the mobile communication system 1 includes a UE_A 10, an access network_A 80, a core network_A 90, a Packet Data Network (PDN)_A 5, an access network_B 120, a core network_B 190, and a Data Network (DN)_A 6.

In the following description, the symbols may be omitted, such as in a UE, an access network_A, a core network_A, a PDN, an access network_B, a core network_B, and a DN, in regard to these apparatuses and functions.

Also, FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, such as in a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone and a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or may be referred to as a terminal apparatus.

The access network_A corresponds to an Evolved Universal Terrestrial Radio Access Network (E-UTRAN) and/or a radio LAN access network. In the E-UTRAN, one or more evolved Node Bs (eNBs) 45 are deployed. Note that in the following description, the symbol of the eNB 45 may be omitted such as in an eNB. In a case that there are multiple eNBs, the eNBs are connected to each other via, for example, an X2 interface. In the radio LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol of the gNB 122 may be omitted, such as in an eNB. The gNB is a node that provides a New Radio (NR) user plane and control plane to the UE, and is a node that is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

Also, a non-3GPP access network may be an untrusted non-3GPP access network or may be a trusted non-3GPP access network. Here, the untrusted non-3GPP access network may be a non-3GPP access network that is an access network in which security management is not performed, such as public wireless LAN, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The radio LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a mobile communication operator (Mobile Network Operator MNO)) connecting the access network (the access network_A and/or the access network_B) and the PDN and/or the DN, may refer to a core network for a mobile communication operator that operates and manages the mobile communication system 1, or may be a core network for a virtual mobile communication operator and a virtual mobile communication service provider such as a Mobile Virtual Network Operator (MVNO) and a Mobile Virtual Network Enabler (MVNE).

FIG. 1 illustrates a case that the PDN and the DN are the same; however, the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network_A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (LP) communication but also non-IP communication may be used.

Here, the IP communication refers to data communication using the IP, and data is transmitted and/or received using IP packets. The IP packet includes an IP header and a payload part. In the payload part, data transmitted and/or received by the apparatuses and functions included in the EPS and the apparatuses and functions included in the 5GS may be included. The non-IP communication refers to data communication not using the IP, and data is transmitted and/or received in a form different from the structure of the IP packets. For example, non-IP communication may be data communication implemented through transmission and/or reception of application data not to which an IP header is not added, or user data transmitted and/or received by the UE may be transmitted and/or received with another header such as a MAC header and an Ethernet (trade name) frame header added.

Also, apparatuses which are not illustrated in FIG. 2 may be configured in the access network_A, the core network_A, the access network_B, the core network_B, the PDN_A, and the DN_A. For example, the core network_A and/or the core network_B may include an Authentication Server Function (AUSF) and an Authentication, authorization, and accounting (AAA) server (AAA-S).

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

Also, the AAA server is an apparatus that is connected directly to the AUSF or indirectly to the AUSF via another network apparatus and has authentication, approval, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a third party.

Note that although each of the apparatuses and functions is illustrated one by one for simple illustration in FIG. 2, multiple similar apparatuses and functions may be configured in the mobile communication system 1. Specifically, multiple apparatuses and functions such as the UE_A 10, the E-UTRAN 80, the MME 40, the SGW 35, the PGW-U 80, the PGW-C 32, the PCRF 60, the HSS 50, the 5G AN 120, the AMF 140, the UPF 130, the SMF 132, the PCF 160, and/or the UDM 150 may be configured in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. Each storage unit can store identification information, control information, flags, parameters, and the like included in a control message transmitted and/or received in various communication procedures to be described later. Each storage unit may store these pieces of information for each UE. In a case that each storage unit performs interworking between the 5GS and the EPS, each storage unit can store a control message and user data transmitted and/or received to and/or from the apparatuses and functions included in the 5GS and/or the EPS. In this case, not only information transmitted and/or received over the N26 interface but also information transmitted and/or received without using the N26 interface can be stored.

2.1. Apparatus Configuration of UE

Figure 3:
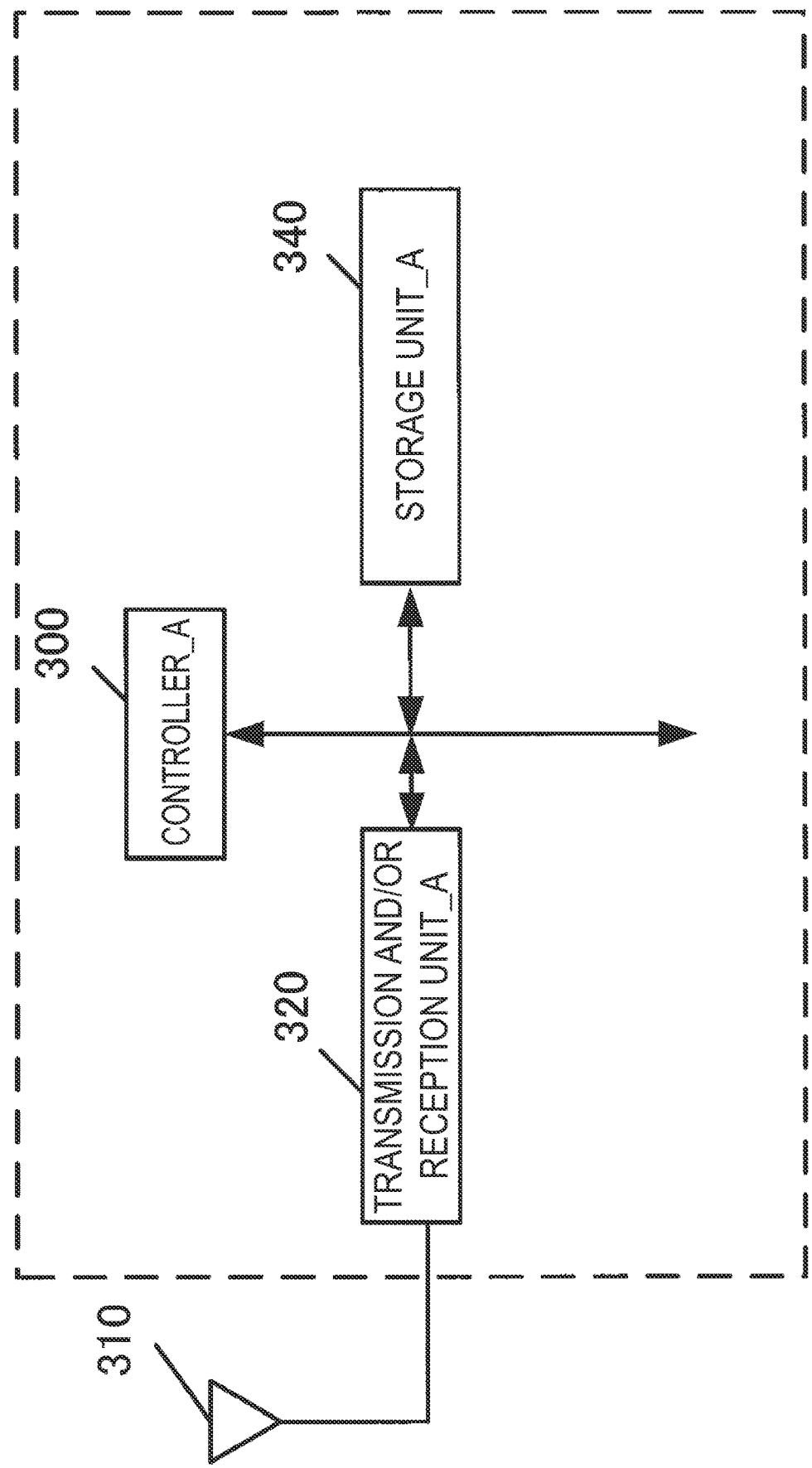
FIG. 3 is a diagram illustrating an apparatus configuration of a UE.

First, an apparatus configuration example of the User Equipment (UE) will be described with reference to FIG. 3. The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 connects to the antenna 310.

The controller_A 300 is a function unit that controls the entire operations and functions of the UE. The controller_A 300 reads and performs various programs stored in the storage unit_A 340 as necessary, and thereby implements various types of processing in the UE.

The transmission and/or reception unit_A 320 is a function unit for performing radio communication with the base station apparatus (the eNB or the gNB) in the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

Detailed description is given with reference to FIG. 2. With the use of the transmission and/or reception unit_A 320, the UE can communicate with the base station apparatus (eNB) in the E-UTRAN over the LTE-Uu interface. The UE can communicate with the base station apparatus (gNB) in the 5G AN with the use of the transmission and/or reception unit_A 320. The UE can transmit and/or receive a Non-Access-Stratum (NAS) message to and/or from the AMF over the N1 interface with the use of the transmission and/or reception unit_A 320. Note that the N1 interface is a logical interface, and thus communication between the UE and the AMF is actually performed over the 5G AN.

The storage unit_A 340 is a function unit for storing programs, user data, control information, and the like necessary for each operation of the UE.

2.2. Apparatus Configuration of gNB

Figure 4:
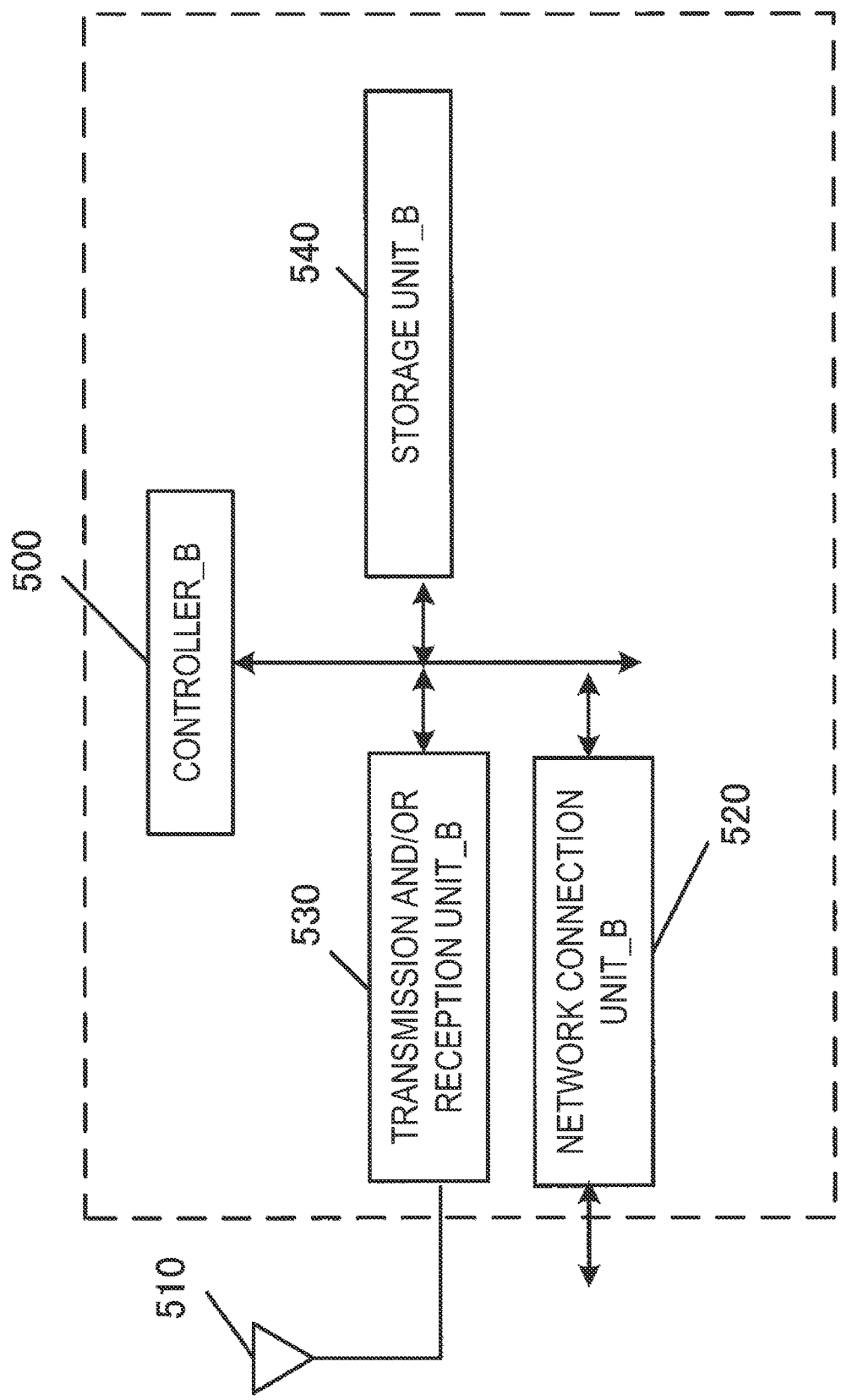
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 connects to the antenna 510.

The controller_B 500 is a function unit that controls the entire operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit for performing radio communication with the UE via the antenna 510. In other words, with the use of the transmission and/or reception unit_B 530, the gNB can transmit and/or receive user data and/or control information to and/or from the UE.

Detailed description is given with reference to FIG. 2. With the use of the network connection unit_B 520, the gNB in the 5G AN can communicate with the AMF over the N2 interface and can communicate with the UPF over the N3 interface. The gNB can communicate with the UE with the use of the transmission and/or reception unit_B 530.

The storage unit_B 540 is a function unit for storing programs, user data, control information, and the like necessary for each operation of the gNB.

2.3. Apparatus Configuration of AMF

Figure 5:
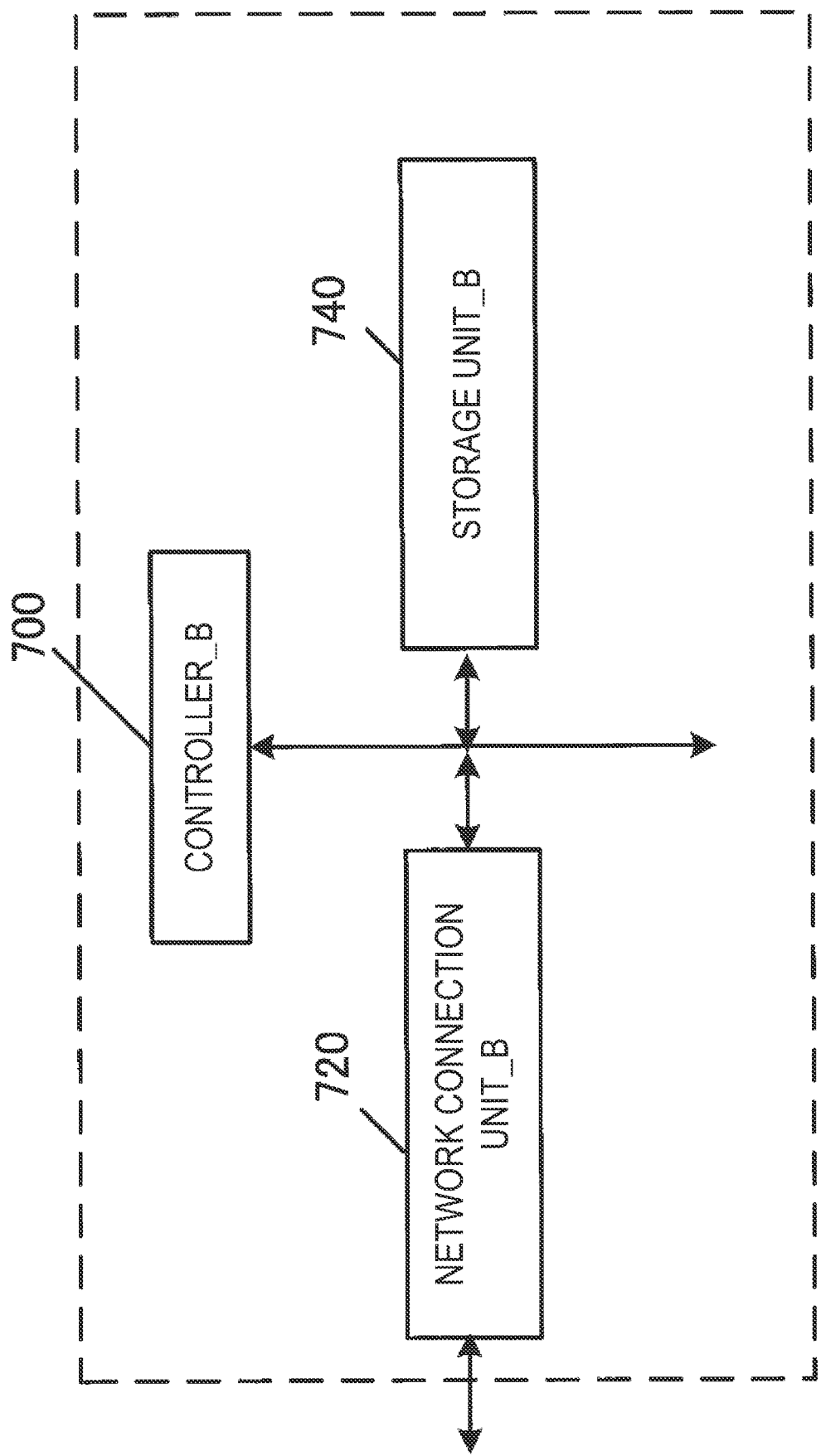
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles the control plane.

The controller_B 700 is a function unit that controls the entire operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB), and/or the SMF, and/or the PCF, and/or the UDM, and/or the SCEF in the 5G AN. In other words, with the use of the network connection unit_B 720, the AMF can transmit and/or receive user data and/or control information to and/or from the base station apparatus (gNB), and/or the SMF, and/or the PCF, and/or the UDM, and/or the SCEF in the 5G AN.

Detailed description is given with reference to FIG. 2. With the use of the network connection unit_A 620, the AMF in the 5GCN can communicate with the gNB over the N2 interface, can communicate with the UDM over the N8 interface, can communicate with the SMF over the N11 interface, and can communicate with the PCF over the N15 interface. The AMF can transmit and/or receive a NAS message to and/or from the UE over the N1 interface with the use of the network connection unit_A 620. Note that the N1 interface is a logical interface, and thus communication between the UE and the AMF is actually performed over the 5G AN. In a case that the AMF supports the N26 interface, the AMF can communicate with the MME over the N26 interface with the use of the network connection unit_A 620.

The storage unit_B 740 is a function unit for storing programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered with the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is 5GMM-REGISTERED, the UE_A 10 may start transmission and/or reception of user data and a control message, or may respond to paging. In addition, note that, in a case that each apparatus is 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is in a state of being unable to reach the UE_A 10. Note that, in a case that each apparatus is 5GMM-DEREGISTERED, the UE_A 10 may initiate the registration procedure, or may perform the registration procedure to thereby establish the 5GMM context.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In the CM-IDLE state, the UE does not have connection of the N2 interface (N2 connection) and connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

One or more AMFs may be deployed in the core network_B. The AMF may be an NF that manages one or more Network Slice Instances (NSIs). The AMF may be a common CP function (Common Control Plane Network Function (CPNF) (CCNF)) shared among multiple NSIs.

Note that, in a case that the UE connects to the 5GS over non-3GPP access, the N3IWF is an apparatus deployed and/or a function allocated between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls the entire operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

Detailed description is given with reference to FIG. 2. With the use of the network connection unit_A 620, the SMF in the 5GCN can communicate with the AMF over the N11 interface, can communicate with the UPF over the N4 interface, can communicate with the PCF via the N7 interface, and can communicate with the UDM over the N10 interface.

The storage unit_B 740 is a function unit for storing programs, user data, control information, and the like necessary for each operation of the SMF.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN via the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls the entire operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB), and/or the SMF, and/or the DN in the 5G AN. In other words, with the use of the network connection unit_B 720, the UPF can transmit and/or receive user data and/or control information to and/or from the base station apparatus (gNB), and/or the SMF, and/or the DN in the 5G AN.

Detailed description is given with reference to FIG. 2. With the use of the network connection unit_A 620, the UPF in the 5GCN can communicate with the gNB over the N3 interface, can communicate with the SMF over the N4 interface, can communicate with the DN over the N6 interface, and can communicate with another UPF over the N9 interface.

The storage unit_B 740 is a function unit for storing programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or may not have a function of converting non-IP communication and IP communication. In addition, multiple deployed gateways may be gateways for connecting the core network_B and a single DN. Note that the UPF may have connectivity with another NF, and may connect to each apparatus via another NF.

Note that the user plane refers to user data that is transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message that is transmitted and/or received in order to perform communication control of the UE or the like. The control plane may be transmitted and/or received using Non-Access-Stratum (NAS) signalling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane, or may be hereinafter referred to as a C-Plane.

In addition, the User Plane (U-Plane (UP)) may be a communication path for transmitting and/or receiving user data, and may include multiple bearers. In addition, the Control Plane (C-Plane (CP)) may be a communication path for transmitting and/or receiving a control message, and may include multiple bearers.

2.6. Description of Other Apparatuses and/or Functions and/or Identification Information According to Present Embodiment Now, other apparatuses and/or functions and/or identification information will be described.

A network refers to at least some of the access network_B, the core network_B, and the DN. One or more apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF_A 240. In addition, the SM message may include a PDU session establishment request message, a PDU session establishment accept message, a PDU session complete message, a PDU session reject message, a PDU session modification request message, a PDU session modification accept message, a PDU session modification response message, and the like. The procedure for SM may include a PDU session establishment procedure.

A Mobility management (MM) message (also referred to as a NAS MM message) may be a NAS message used in a procedure for MM, or may be a control message transmitted and/or received between the UE_A 10 and the SMF_A 230 via the AMF_A 240. Furthermore, the MM message may include a registration request message, a registration accept message, a registration reject message, a registration release request message, a registration release accept message, a UE configuration update request message, a UE configuration update accept message, and the like. The procedure for MM may include a registration procedure, a registration release procedure, a UE configuration update procedure, and an authentication and/or authorization procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non-EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using a PDU session.

Note that each apparatus (the UE, and/or the access network apparatus, and/or the core network apparatus) may associate one or more pieces of identification information with PDU session(s) for management. Note that these pieces of identification information may include one or more of a DNN, a QoS rule, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_A 30/UPF_A 235 connecting the core network_B 190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using Point-to-Point (P2P) tunneling technique. For the P2P tunneling technique, for example, UDP/IP encapsulation technique may be used. Note that the PDU session type may include the IP, in addition to the above. The IP can be specified in a case that the UE can use both of IPv4 and IPv6.

A network slice (NS) is a logical network that provides specific network capability and network characteristics. The UE and/or the network can support the network slice (NW slice (NS)) in the 5GS.

A network slice instance (NSI) includes a set of an instance (entity) of a network function (NF) and necessary resources and forms a network slice to be allocated. Here, the NF is a processing function in a network, and is adopted or defined in 3GPP. The NSI is an entity of one or more NSs configured in the core network_B. The NSI may include a virtual Network Function (NF) generated using a Network Slice Template (NST). Here, the NST is associated with a resource request for provision of a requested communication service and capability, and is a logical expression of one or more NFs. In other words, the NSI may be a set of multiple NFs in the core network_B 190. The NSI may be a logical network configured for classifying user data to be delivered depending on a service or the like. In the NS, one or more NFs may be configured. The NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more S-NSSAIs in the registration information of the UE as default S-NSSAI(s). Note that, in a case that the S-NSSAI is a default S-NSSAI, and the UE does not transmit to a network a valid S-NSSAI in a registration request message, the network may provide an NS related to the UE.

The Network Slice Selection Assistance Information (NS-SAI) is a set of pieces of S-NSSAI. Each S-NSSAI included in the NSSAI is information for assisting the access network or the core network to select the NSI. The UE may store the NSSAI allowed by the network for each PLMN. The NSSAI may be information used for selecting the AMF.

Configured NSSAI is NSSAI supplied into and stored in the UE. The UE may store the configured NSSAI for each PLMN. The configured NSSAI may be information configured by the network (or PLMN).

Requested NSSAI is NSSAI provided from the UE to the network during the registration procedure. The requested NSSAI may be allowed NSSAI or configured NSSAI stored by the UE. Specifically, the requested NSSAI may be information indicating a network slice that the UE desires to access. The S-NSSAI included in the requested NSSAI may be represented as requested S-NSSAI. For example, the requested NSSAI is transmitted while being included in an NAS message such as a registration request message or a PDU session establishment request message which is transmitted from the UE to the network or in a Radio Resource Control (RRC) message including the Non-Access-Stratum (NAS) message.

Allowed NSSAI is information indicating one or multiple network slices allowed for the UE. In other words, the allowed NSSAI is information for identifying a network slice allowed by the network for the UE for connection. The UE and the network each stores and manages the allowed NSSAI as information of the UE for each access (3GPP access or non-3GPP access). The S-NSSAI included in the allowed NSSAI may be represented as allowed S-NSSAI.

Rejected NSSAI is information indicating one or multiple network slices not allowed for the UE. In other words, the rejected NSSAI is information for identifying a network slice not allowed by the network for the UE for connection. The rejected NSSAI may be information including one or multiple combinations of S-NSSAI and a cause value. Note that the cause value is information indicating why the network rejects the corresponding S-NSSAI. The UE and the network may each appropriately store and manage the rejected NSSAI based on the cause value associated with each piece of S-NSSAI. Furthermore, the rejected NSSAI may be included in the NAS message transmitted from the network to the UE, such as the registration accept message, the configuration update command, or the registration reject message, or may be included in the RRC message including the NAS message. The S-NSSAI included in the rejected NSSAI may be represented as rejected S-NSSAI. The rejected NSSAI may be any of the first rejected NSSAI to the fourth rejected NSSAI, or may be a combination of any of the first to fourth rejected NSSAIs.

In this regard, the first rejected NSSAI is a set of one or more pieces of S-NSSAI that are not available in the current PLMN, the one or more pieces of S-NSSAI being included in the S-NSSAI included in the requested NSSAI by the UE. The first rejected NSSAI may be Rejected NSSI for the current PLMN in the 5GS. The first rejected NSSAI may be rejected NSSAI stored by the UE or the NW, or may be rejected NSSAI transmitted from the NW to the UE. In a case that the first rejected NSSAI is rejected NSSAI transmitted from the NW to the UE, the first rejected NSSAI may be information including one or multiple combinations of S-NSSAI and a reject cause value. The reject cause value in this case may be "S-NSSAI is not available in the current PLMN," and may be information indicating that the S-NSSAI associated with the cause value is not available in the current PLMN.

The first rejected NSSAI is valid for the entire registered PLMN. In other words, the UE and/or NW may handle the first rejected NSSAI and the S-NSSAI included in the first rejected NSSAI, as information not depending on the access type. In other words, the first rejected NSSAI may be information valid for 3GPP access and non-3GPP access.

In a case that the UE has transitioned to a deregistered state in both 3GPP and non-3GPP accesses to the current PLMN, the UE may delete the first rejected NSSAI from storage. In other words, in a case that the UE transitions to the deregistered state for the current PLMN via one access, or successfully registers with a new PLMN via the certain one access, or fails to register with the new PLMN via the one access and transition to the deregistered state and further that the UE is not registered for the other access (deregistered state), the UE deletes the first rejected NSSAI.

The second rejected NSSAI is a set of one or multiple pieces of S-NSSAI that are not available in the current registration area, the one or multiple pieces of S-NSSAI being included in the S-NSSAI included in the requested NSSAI by the UE. The second rejected NSSAI may be 5GS Rejected NSSI for the current registration area. The second rejected NSSAI may be rejected NSSAI stored by the UE or the NW, or may be rejected NSSAI transmitted from the NW to the UE. In a case that the second rejected NSSAI is rejected NSSAI transmitted from the NW to the UE, the second rejected NSSAI may be information including one or multiple combinations of S-NSSAI and a cause value. The cause value in this case may be "S-NSSAI is not available in the current registration area," and may be information indicating that the S-NSSAI associated with the cause value is not available in the current registration area.

The second rejected NSSAI is valid in the current registration area. In other words, the UE and/or the NW may handle the second rejected NSSAI and the S-NSSAI included in the second rejected NSSAI as information for each access type. In other words, the second rejected NSSAI may be valid information for each of 3GPP access or non-3GPP access. In other words, once the UE transitions to the deregistered state for one access, the UE may delete the second rejected NSSAI from storage.

Third rejected NSSAI is a set of one or multiple pieces of S-NSSAI for which the network requires network slice specific authentication and for which the network slice specific authentication is not completed and which is not available in the current PLMN. The third rejected NSSAI may be Rejected NSSAI due to network slice specific authentication and authorization in the 5GS. The third rejected NSSAI may be NSSAI stored by the UE or the NW, or may be NSSAI transmitted from the NW to the UE. Note that the third rejected NSSAI is not limited to the rejected NSSAI but may be NSSAI independent of the rejected NSSAI. In a case that the third rejected NSSAI is the NSSAI transmitted to the UE from the NW, the third rejected NSSAI may be information including one or multiple combinations of S-NSSAI and a reject cause value. The reject cause value in this case may be "Network slice-specific authentication and authorization is pending for the S-NSSAI," and may be information in which the S-NSSAI associated with the reject cause value indicates that the use by the UE is prohibited or remains pending until the Network slice-specific authentication and authorization for the S-NSSAI is completed.

The third rejected NSSAI is valid for the entire registered PLMN. In other words, the UE and/or the NW may handle the third rejected NSSAI and the S-NSSAI included in the third rejected NSSAI as information not depending on the access type. In other words, the third rejected NSSAI may be information valid for the 3GPP access and the non-3GPP access. The third rejected NSSAI may be the first rejected NSSAI.

The third rejected NSSAI is NSSAI including one or multiple pieces of S-NSSAI identifying slices for which a procedure is made pending by the UE. Specifically, the UE does not initiate a registration request procedure for the S-NSSAI included in the third rejected NSSAI while storing the third rejected NSSAI. In other words, the UE does not use the S-NSSAI included in the third rejected NSSAI during the registration procedure until the Network Slice-Specific Authentication and Authorization for the S-NSSAI included in the third rejected NSSAI is completed. The third rejected NSSAI is identification information including one or multiple pieces of S-NSSAI received from the core network and associated with the reject cause value indicating a pending state for the Network Slice-Specific Authentication and Authorization. The third rejected NSSAI is information not depending on the access type. Specifically, in a case that the UE stores a third rejected NSSAI, the UE does not attempt to transmit the registration request message including the S-NSSAI included in the third rejected NSSAI, in the 3GPP access or in the non-3GPP access.

Fourth rejected NSSAI is a set of one or multiple pieces of S-NSSAI that require the Network Slice-Specific Authentication and Authorization and which the Network Slice-Specific Authentication and Authorization has failed or has been revoked for the S-NSSAI. The fourth rejected NSSAI may be NSSAI stored by the UE and/or the NW, or may be transmitted from the NW to the UE. In a case that the fourth rejected NSSAI is transmitted from the NW to the UE, the fourth rejected NSSAI may be information including one or multiple combinations of S-NSSAI and a reject cause value. The reject cause value in this case may be "S-NSSAI is not available due to the failed or revoked network slice-specific authorization and authentication," and may be information indicating that the Network slice-specific authentication and authorization for the S-NSSAI associated with the reject cause value has failed or has been revoked.

The fourth rejected NSSAI is valid for the whole registered PLMN. In other words, the UE and/or the NW may handle the fourth rejected NSSAI and the S-NSSAI included in the fourth rejected NSSAI as information not depending on the access type. In other words, the fourth rejected NSSAI may be information valid for the 3GPP access and the non-3GPP access. The fourth rejected NSSAI may be NSSAI different from the rejected NSSAI. The fourth rejected NSSAI may be the first rejected NSSAI.

The fourth rejected NSSAI is rejected NSSAI with which the UE identifies a slice rejected by the core network due to the failed or revoked Network Slice-Specific Authentication and Authorization. Specifically, the UE does not initiate the registration request procedure for the S-NSSAI included in the fourth rejected NSSAI while storing the fourth rejected NSSAI. The fourth rejected NSSAI may be identification information including one or multiple pieces of S-NSSAI received from the core network and associated with the reject cause value indicating the failed Network Slice-Specific Authentication and Authorization. The fourth rejected NSSAI is information not depending on the access type. Specifically, in a case that the UE stores the fourth rejected NSSAI, the UE need not attempt to transmit the registration request message including the S-NSSAI included in the fourth rejected NSSAI, in the 3GPP access or in the non-3GPP access. Alternatively, based on a UE policy, the UE can transmit the registration request message including the S-NSSAI included in the fourth rejected NSSAI. Alternatively, the UE may delete the fourth rejected NSSAI based on the UE policy to transition to a state in which the UE can transmit the registration request message including the S-NSSAI included in the fourth rejected NSSAI. In other words, in a case of transmitting the registration request message including the S-NSSAI included in the fourth rejected NSSAI, based on the UE policy, the UE may delete the S-NSSAI from the fourth rejected NSSAI.

A tracking area is a single or multiple ranges that can be expressed using the location information of the UE_A 10 managed by the core network. The tracking area may include multiple cells. In addition, the tracking area may be an area in which a control message such as paging is broadcast, or may be an area in which the UE_A 10 can move without performing a handover procedure. In addition, the tracking area may be a routing area, or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

The registration area is a set of one or multiple TAs allocated to the UE by the AMF. Note that while the UE_A 10 is moving within one or multiple TAs included in the registration area, the UE_A 10 may be able to move without transmitting and/or receiving a signal for tracking area update. In other words, the registration area may be an information group indicating an area in which the UE_A 10 can move without performing a tracking area update procedure. The registration area may be identified by a TAI list including one or multiple TAIs.

A UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

A Network Slice-Specific Authentication and Authorization function is a function to achieve the network slice-specific authentication and authorization. The network slice-specific authentication and authorization allows the UE to be authenticated and authorized outside the core network, such as in a 3rd Party. The PLMN and network apparatus with the Network Slice-Specific Authentication and Authorization function can perform the Network Slice-Specific Authentication and Authorization procedure on certain S-NSSAI based on the UE registration information. Furthermore, the UE with the Network Slice-Specific Authentication and Authorization function can manage and store the rejected NSSAI due to pending for the Network Slice-Specific Authentication and Authorization and/or the rejected NSSAI due to the failed Network Slice-Specific Authentication and Authorization. In this document, the Network Slice-Specific Authentication and Authorization may hereinafter be referred to as the network slice-specific authentication and authorization procedure or the authentication and authorization procedure.

The S-NSSAI requiring the Network Slice-Specific Authentication and Authorization is S-NSSAI requiring the Network Slice-Specific Authentication and Authorization managed by the core network and/or the core network apparatus. The core network and/or core network apparatus may store the S-NSSAI requiring the Network Slice-Specific Authentication and Authorization by storing the S-NSSAI in association with information indicating whether the Network Slice-Specific Authentication and Authorization is required. The core network and/or the core network apparatus may further store the S-NSSAI requiring the Network Slice-Specific Authentication and Authorization in association with information indicating whether the Network Slice-Specific Authentication and Authorization is completed, or information indicating a state of being allowed or being successful through completion of the Network Slice-Specific Authentication and Authorization. The core network and/or core network apparatus may manage the S-NSSAI requiring the Network Slice-Specific Authentication and Authorization as information not related to an access network.

Now, identification information transmitted and/or received and stored and managed by each apparatus will be described in the present embodiment. 1st identification information may be information indicating that the UE supports the Network Slice-Specific Authentication and Authorization function. Alternatively, the 1st identification information may be information indicating whether the Network Slice-Specific Authentication and Authorization function is supported. The 1st identification information may be 5GMM capability information. The 1st identification information may be information indicating that the UE can store the first rejected NSSAI and/or the second rejected NSSAI.

2nd identification information is information for identifying a slice requested by the UE. Specifically, the 2nd identification information may be requested NSSAI, or may include one or multiple pieces of S-NSSAI. The S-NSSAI included in the 2nd identification information may be S-NSSAI included in Configured NSSAI stored by the UE or S-NSSAI included in Allowed NSSAI. Furthermore, the UE does not include, in the 2nd identification information, the S-NSSAI included in the rejected NSSAI stored by the UE.

Specifically, in a case that the UE stores the rejected NSSAI associated with the PLMN to which the 2nd identification information is transmitted, the UE determines whether to include each S-NSSAI included in the rejected NSSAI, in the 2nd identification information in accordance with the cause value associated with the S-NSSAI. For example, the UE does not include, in the 2nd identification information, the S-NSSAI associated with the cause value indicating the pending state due to the Network Slice-Specific Authentication and Authorization.

3rd identification information is information indicating a user ID and/or a UE ID used for the Network Slice-Specific Authentication and Authorization for the slice requested by the UE. Specifically, the 3rd identification information may be the user ID and/or the UE ID for the Network Slice-Specific Authentication and Authorization, which ID is associated with the S-NSSAI, and may be GPSI. The 3rd identification information may be linked with the 2nd identification information.

11th identification information is information indicating that the core network and/or the core network apparatus supports the Network Slice-Specific Authentication and Authorization function. The 11th identification information may be 5GMM NW capability information. The 11th identification information may be information indicating that the core network is in a state of being capable of performing the Network Slice-Specific Authentication and Authorization procedure based on the Network Slice-Specific Authentication and Authorization function of the UE.

12th identification information is information for identifying a slice allowed by the core network. Specifically, the 12th identification information may be Allowed NSSAI, or may include one or more pieces of S-NSSAI. The 12th identification information may be information for each access. In a case that the core network does not store allowed NSSAI that can be transmitted to the UE and further that allowed NSSAI may be allocated in the future, the 12th identification information may be empty.

13th identification information is information for identifying a set of one or multiple pieces of S-NSSAI rejected by the core network, the one or multiple pieces of the S-NSSAI being included in the 2nd identification information, and in other words, information for identifying a set of pieces of S-NSSAI not allowed by the core network. The 13th identification information may be rejected NSSAI in the 5GS. Specifically, the 13th identification information may be information including one or multiple pieces of S-NSSAI and respective cause values linked with the respective pieces of S-NSSAI. The 13th identification information may be rejected NSSAI configured with at least one of the first rejected NSSAI to the fourth rejected NSSAI.

14th identification information is a value of a timer indicating the time of the pending state due to the Network Slice-Specific Authentication and Authorization. In other words, the 14th identification information may be information indicating the start of count of the timer using the value of the timer indicated by the 14th identification information. The 14th identification information may be associated with the 13th identification information, or may be transmitted and/or received in combination with the 13th identification information as one piece of information.

15th identification information is information indicating that the AMF with which the UE is registered has changed from the previous registration destination AMF. The 15th identification information may be a flag or identification information. The 15th identification information may be information for identifying the AMF, and may be, for example, a Globally Unique Temporary Identifier (GUTI), or an AMF Region ID or an AMF Set ID included in the GUTI, or an AMF Pointer. The 15th identification information may be the registration area.

16th identification information may be information indicating whether to delete the third rejected NSSAI stored by the UE. Alternatively, the 16th identification information may be information indicating that the UE deletes the third rejected NSSAI.

The 16th identification may be information including one or multiple pieces of S-NSSAI indicating to the UE to perform deletion from the third rejected NSSAI. Specifically, in a case that the NW transmits the 16th identification information to the UE, the UE may delete, from the third rejected NSSAI, one or multiple pieces of S-NSSAI included in the 16th identification information.

21st identification information is information for identifying a slice allowed to the UE by the network. The 21st identification information may be allowed NSSAI. The 21st identification information may be a newly allocated allowed NSSAI. The 21st identification information may include S-NSSAI included in the rejected NSSAI due to the pending state attributed to the Slice specific Authentication.

The 22nd identification information is information for identifying a slice rejected by the core network, and in other words, information for identifying a slice not allowed by the core network. The 22nd identification information may be rejected NSSAI in the 5GS. Specifically, the 22nd identification information may be information including one or multiple pieces of S-NSSAI and respective cause values linked with the respective pieces of S-NSSAI. The 22nd identification information may be rejected NSSAI configured with at least one of the first rejected NSSAI to the fourth rejected NSSAI.

25th identification information may be information indicating that the UE is requested to initiate a registration procedure again. The 25th identification information may be information indicated in Configuration update indication IE (information Element).

31st identification information is information for identifying a slice rejected by the core network, and in other words, information for identifying a slice not allowed by the core network. The 31th identification information may be rejected NSSAI in the 5GS. Specifically, the 31st identification information may be information including one or one or more pieces of S-NSSAI and respective reject cause values linked with the respective pieces of S-NSSAI. The 31th identification information may be rejected NSSAI configured with at least one of the first rejected NSSAI to the fourth rejected NSSAI.

32nd identification information is information provided by the core network to the UE and indicating that no allowed NSSAI is currently available. The 32nd identification information may be 5GMM cause No network slices available in the 5G.

Note that each apparatus may exchange and/or acquire various pieces of capability information and/or request information of each apparatus in broadcast information and/or an RRC procedure and/or a procedure for registration with the core network and/or a service request procedure for an emergency call.

Furthermore, each apparatus involved in the present procedure may transmit and/or receive each control message described in the present procedure to transmit and/or receive one or more pieces of identification information included in each control message and store each piece of identification information transmitted and/or received as a context.

41st identification information is information for identifying a slice rejected by the core network, and in other words, information for identifying a slice not allowed by the core network. The 41st identification information may be rejected NSSAI in the 5GS. Specifically, the 41st identification information may be information including one or multiple pieces of S-NSSAI and respective reject cause values linked with the respective pieces of S-NSSAI. The 41st identification information may be rejected NSSAI including at least one of the first rejected NSSAI to the fourth rejected NSSAI. The 41st identification information may be the same as the 31st identification information. 42nd identification information is information provided by the core network to the UE and indicating that no allowed NSSAI is currently available. In other words, the 42nd identification information may be information indicating a state in which the UE does not have a network slice that is currently available. The 42nd identification information may be 5GMM cause value #62 in the 5G "No network slices available." The 42nd identification information may be the same as the 32nd identification information.

43rd identification information is information indicating which access is to be used by the network in this deregistration procedure to cause the UE to transition to the deregistered state. Specifically, the 43rd identification information may be information indicating that the de-registration procedure is intended only for the 3GPP access, or only for the non-3GPP access, or for both the 3GPP access and the non-3GPP access. The 43rd identification information may be an access type included in a de-registration type (De-registration type) IE of a 5GS mobility management (5GMM) IE in the 3GPP.

3.1. Description of Procedures Used in Each Embodiment

Next, procedures used in each embodiment will be described. Note that the procedures used in each embodiment include a Registration procedure, a Network Slice-Specific Authentication and Authorization procedure, a UE configuration update procedure (Generic UE configuration update procedure), and a Network-initiated de-registration procedure. Each procedure will be described below.

Note that, in each embodiment, a case that each of the combinations including the HSS and the UDM, the PCF and the PCRF, the SMF and the PGW-C, and the UPF and the PGW-U is configured to form a single apparatus (that is, the same physical hardware, or the same logical hardware, or the same software) as illustrated in FIG. 2 will be described as an example. However, the details described in the present embodiment can also be applied to a case that each of the combinations is configured to form different apparatuses (that is, different pieces of physical hardware, or different pieces of logical hardware, or different pieces of software). For example, data may be directly transmitted and/or received between these apparatuses, data may be transmitted and/or received over the N26 interface between the AMF and the MME, or data may be transmitted and/or received via the UE.

3.2. Registration Procedure

First, the Registration procedure will be described with reference to FIG. 6. Hereinafter, the present procedure will refer to the registration procedure. The registration procedure is a procedure for registration with the access network_B, and/or the core network_B, and/or the DN as initiated by the UE. In a case that the UE is in a state of not being registered with the network, for example, the UE can perform the present procedure at any timing such as the timing at which the UE is turned on. In other words, the UE can initiate the present procedure at any timing in a case that the UE is in the deregistered state (5GMM-DEREGISTERED state). Each apparatus (in particular, the UE and the AMF) can transition to the registered state (5GMM-REGISTERED state), based on completion of the registration procedure. Note that each registration state may be managed by each apparatus for each access. Specifically, each apparatus may independently manage the registration state (registered state or deregistered state) for the 3GPP access and the registration state for the non-3GPP access.

In addition, the registration procedure may be a procedure for updating position registration information of the UE in the network, and/or periodically giving a notification of the state of the UE from the UE to the network, and/or updating a specific parameter related to the UE in the network.

In a case that the UE performs mobility for crossing a TA, the UE may initiate the registration procedure. In other words, in a case that the UE moves to a TA that is different from the TA indicated in the stored TA list, the UE may initiate the registration procedure. In addition, the UE may initiate the present procedure in a case that a running timer expires. In addition, the UE may initiate the registration procedure in a case that a context of each apparatus needs to be updated due to disconnection and deactivation of a PDU session. In addition, in a case that there is a change in capability information and/or a preference, related to PDU session establishment, of the UE, the UE may initiate the registration procedure. In addition, the UE may periodically initiate the registration procedure. Moreover, the UE may initiate the registration procedure based on completion of the UE configuration update procedure, or based on completion of the registration procedure, or based on completion of the PDU session establishment procedure, or based on completion of the PDU session management procedure, or based on information received from the network in each procedure. Note that these are not restrictive, and the UE can perform the registration procedure at any timing.

Note that the above described procedure for the UE to transition from a state of not being registered with the network to a state of being registered with the network may be considered to be an initial registration procedure or a registration procedure for initial registration and that the registration procedure performed in a state in which the UE is registered with the network may be considered to be a registration procedure for mobility and periodic registration update or a mobility and periodic registration procedure.

Figure 6:
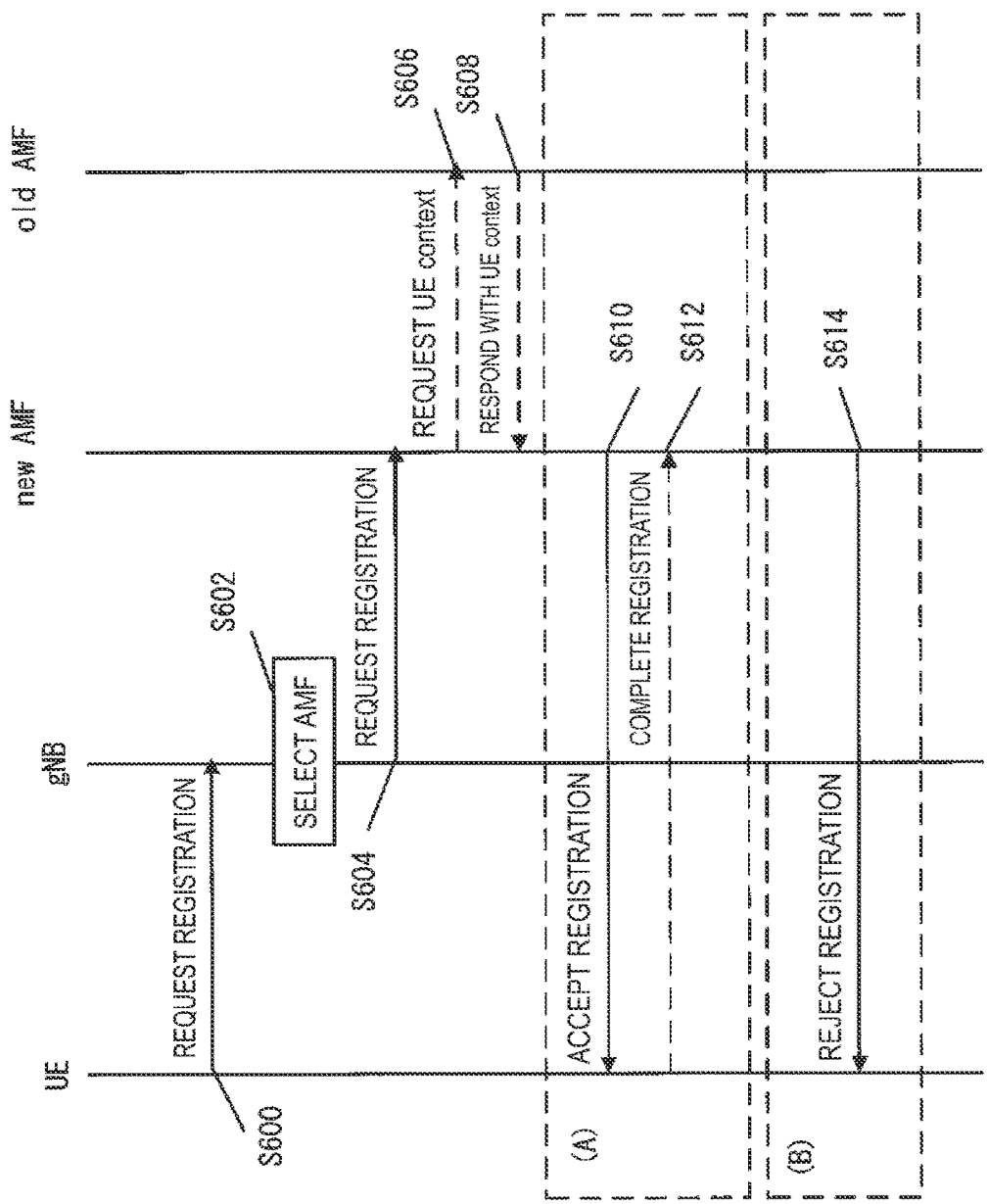
FIG. 6 is a diagram illustrating a registration procedure.

A new AMF in FIG. 6 indicates the AMF with which the UE is registered by the present procedure, and an old AMF in FIG. 6 means the AMF with which the UE is registered by a procedure preceding the present procedure. In a case that the AMF is not changed within the present procedure, no interface or procedure is generated between the old AMF and the new AMF, and the new AMF may be the same apparatus as that of the old AMF. The AMF described in the present embodiment may mean the new AMF or the old AMF or both the new AMF and the old AMF.

First, the UE initiates the registration procedure by transmitting the Registration request message to the new AMF (S600), (S602), and (S604). Specifically, the UE transmits an RRC message including the registration request message to the 5G AN (or the gNB) (S600). Moreover, the registration request message is an NAS message transmitted and/or received over the N1 interface. The RRC message may be a control message transmitted and/or received between the UE and the 5G AN (or the gNB). The NAS message is processed in the NAS layer, and the RRC message is processed in the RRC layer. Note that the NAS layer is a layer higher than the RRC layer.

In this regard, the UE can include one or more of at least the first identification information to the third identification information in the registration request message and/or the RRC message to transmit. Furthermore, the UE may include identification information indicating the type of the present procedure, in the registration request message and/or the RRC message to transmit. In this regard, the identification information indicating the type of the present procedure may be a 5GS Register type IE, and may be information indicating that the present procedure is a registration procedure intended for initial registration, or for update of registration information due to movement, or for periodic update of registration information, or registration for emergency.

The UE may include these pieces of identification information in a control message different from those described above, for example, a control message for any of the layers lower than the RRC layer (e.g., the MAC layer, RLC layer, and PDCP layer) to transmit. Note that, by transmitting these pieces of identification information, the UE may indicate support of each function, a request from the UE, or both. Furthermore, in a case that multiple pieces of identification information are transmitted and/or received, two or more of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Note that the UE may select or determine whether to transmit the first to the third identification information to the network, based on capability information of the UE, and/or a UE policy, and/or the state of the UE, and/or registration information of the user, and/or a context held by the UE, and/or the like.

The UE may transmit the 1st identification information in a case of including the Network Slice-Specific Authentication and Authorization function or requesting at least one piece of S-NSSAI identifying a slice requiring the Network Slice-Specific Authentication and Authorization. By transmitting the 1st identification information, the UE may request the network to handle the UE as a UE with the Network Slice-Specific Authentication and Authorization function, and request the network to perform, in the procedure related to the UE, the authentication and authorization procedure via the Network Slice-Specific Authentication and Authorization function.

In a case of storing allowed NSSAI for requested access to a requested PLMN, and/or holding Configured NSSAI, the UE may transmit the 2nd identification information. The UE may select one or multiple pieces of S-NSSAI1 from the stored allowed NSSAI and/or configured NSSAI and include the selected S-NSSAI1 in the 2nd identification information to transmit. Furthermore, in a case that the UE stores the rejected NSSAI, the UE may transmit the S-NSSAI included in the rejected NSSAI without including the S-NSSAI in the 2nd identification information.

In a case that the S-NSSAI requested by the UE is information for identifying a slice requiring the Network Slice-Specific Authentication and Authorization and/or that the UE stores the identification information (e.g., an Extensible Authentication Protocol (EAP) ID) used for the Network Slice-Specific Authentication and Authorization associated with the S-NSSAI requested by the UE, the UE may transmit the 3rd identification information. By transmitting the 3rd identification information, the UE may request the initiation of the Network Slice-Specific Authentication and Authorization procedure, or may request the result of the Network Slice-Specific Authentication and Authorization to the network.

The UE may include information other than the first to the third identification information in the RRC message including the registration request message and/or the registration request message, and may include, for example, the UE ID, and/or the PLMN ID, and/or AMF identification information in the RRC message to transmit. In this regard, the AMF identification information may be information for identifying the AMF or a set of AMFs, for example, a 5G-Temporary Mobile Subscription Identifier (5G-SS-TMSI) or a Globally Unique AMF Identifier (GUAMI).

By including and transmitting an SM message (for example, the PDU session establishment request message) in the registration request message, or by transmitting an SM message (for example, the PDU session establishment request message) together with the registration request message, the UE may initiate the PDU session establishment procedure during the registration procedure.

In a case that the 5G AN (or the gNB) receives the RRC message including the registration request message, then the 5G AN (or the gNB) selects the AMF to transfer the registration request message (S602). Note that the 5G AN (or the gNB) can select the AMF based on the registration request message and/or one or more pieces of identification information included in the RRC message including the registration request message. Specifically, the 5G AN (or the gNB) may select the new AMF as a transmission destination of the registration request message based on at least one piece of identification information of the first to the third identification information.

For example, the 5G AN (or gNB) may select, based on the 1st identification information, an AMF including the Network Slice-Specific Authentication and Authorization function and/or an AMF with connectivity to a network including the Network Slice-Specific Authentication and Authorization function.

Additionally or alternatively, the 5G AN (or gNB) may select the AMF, based on the 2nd identification information. Specifically, the 5G AN (or gNB) may select an AMF included in the network slice identified by the S-NSSAI included in the 2nd identification information, or an AMF including connectivity to the network slice.

Note that the method of selecting the AMF is not limited to those described above, and the 5G AN (or the gNB) may select the AMF based on other conditions. The 5G AN (or the gNB) extracts the registration request message from the RRC message received and transfers the registration request message to the selected new AMF (S604). Note that in a case that at least one piece of identification information of the first to the third identification information is not included in the registration request message but in the RRC message, the identification information included in the RRC message may be transferred to the selected AMF together with the registration request message (S604).

In a case that the new AMF receives the registration request message, the AMF can perform 1st condition fulfillment determination. The 1st condition fulfillment determination is a condition fulfillment determination for determining whether the network (or the new AMF) accepts the request from the UE. In a case that the 1st condition fulfillment determination is true, the new AMF initiates a procedure following S606 to perform a procedure (A). On the other hand, in a case that the 1st condition fulfillment determination is false, the new AMF may skip the procedure from S606 to S612 and perform a procedure (B).

Alternatively, the new AMF may perform the 1st condition fulfillment determination after receiving the UE context from the old AMF (S608). In that case, in a case that the first condition fulfillment determination is true, the new AMF performs the procedure (A). On the other hand, in a case that the first condition fulfillment determination is false, the new AMF may skip the procedure (A) and perform the procedure (B).

Note that the first condition fulfillment determination may be performed based on reception of the registration request message, and/or each piece of identification information included in the registration request message, and/or subscriber information, and/or capability information of the network, and/or an operator policy, and/or a network state, and/or registration information of a user, and/or a context stored in the AMF, and/or the like.

For example, the first condition fulfillment determination may be true in a case that the network allows the request from the UE, and the first condition fulfillment determination may be false in a case that the network does not allow the request from the UE. In a case that a network with which the UE is to be registered and/or an apparatus in the network supports the function requested by the UE, the 1st condition fulfillment determination may be true, whereas in a case that the network and/or the apparatus does not support the function requested by the UE, the 1st condition fulfillment determination may be false. In addition, in a case that the transmitted and/or received identification information is allowed, the 1st condition fulfillment determination may be true, whereas in a case that the transmitted and/or received identification information is not allowed, the 1st condition fulfillment determination may be false.

In a case that the S-NSSAI included in the requested NSSAI received by the AMF from the UE is information for identifying a slice requiring the Slice-specific Authentication and Authorization procedure and further that the AMF stores, as a success, the result of the Slice specific Authentication and Authorization procedure for the S-NSSAI corresponding to the UE, the 1st condition fulfillment determination may be true. Alternatively, the 1st condition fulfillment determination may be false in a case that no Allowed S-NSSAI to the UE is present and no Allowed NSSAI is scheduled to be allocated to the UE in the future.

First, the case where the 1st condition fulfillment determination is true will be described. The new AMF performs the procedure of S606 and S608 in a case that the new AMF is different from the AMF indicated in the AMF identification information included in the message received from the UE, and does not perform the procedure of S606 and S608 in a case that the new AMF is the same as the AMF indicated in the AMF identification information included in the message received from the UE. In other words, the procedure of S606 and S608 is performed in a case that the AMF is changed due to the present procedure, and the procedure of S606 and S608 is skipped in a case that the AMF is not changed.

A UE context transfer procedure (S606 and S608) will be described. The new AMF defines, as the old AMF, the AMF indicated in the AMF identification information, and transmits a UE context request message to the old AMF (S606). The old AMF transmits the UE context to the new AMF based on the UE context request message received. The New AMF generates a UE context based on the UE context received.

In this regard, the UE context transmitted from the new AMF to the old AMF may include the UE ID and the allowed NSSAI. Furthermore, the UE context may include the configured NSSAI and/or the rejected NSSAI. The allowed NSSAI and/or the configured AMF and/or the rejected NSSAI included in the UE context may be linked with information as to whether notification to the UE is complete.

Furthermore, the UE context may include information regarding the S-NSSAI requiring the Network Slice-Specific Authentication and Authorization procedure, and information indicating to the UE that the Network Slice-Specific Authentication and Authorization procedure is completed, that the authentication is successful, and/or that the authentication has failed.

Now, the procedure (A) in the present procedure will be described. In a case that the new AMF determines that the registration request from the UE is to be accepted, the new AMF transmits the Registration accept message to the UE, based on the determination and/or on the reception of the UE context from the old AMF (S610).

The new AMF may include at least one or more pieces of identification information of the 11th to the 16th identification information in the registration accept message to transmit. Note that, by transmitting these pieces of identification information and/or the registration accept message, the AMF may indicate that the network supports each function, or may indicate that the request from the UE is accepted, or may indicate that the request from the UE is not partly allowed, or may indicate information indicating a combination of the above-described matters. Furthermore, in a case that multiple pieces of identification information are transmitted and/or received, two or more of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

The AMF may transmit at least one piece of identification information of the 11th to the 16th identification information in a case that the AMF receives at least any of the 1st and the 3rd identification information from the UE and/or that the UE configuration information is updated after the previous registration procedure.

The AMF may transmit the 11th identification information in a case that the AMF receives the 1st identification information from the UE and/or initiates the Network Slice-Specific Authentication and Authorization procedure, and/or in a case that the network supports the Network Slice-Specific Authentication and Authorization.

The AMF may include an empty value in the 12th identification information to transmit in a case that no S-NSSAI (allowed NSSAI) is allowed for the UE at the time of transmission of the registration accept message but that the Network Slice-Specific Authentication and Authorization procedure is scheduled to be performed after completion of or in parallel with the present procedure.

Based on reception of the 11th identification information, the UE may recognize that the network includes the Network Slice-Specific Authentication and Authorization function or may store the registration of the UE as a UE including the Network Slice-Specific Authentication and Authorization function.

Based on the reception of the 12th identification information, the UE may identify a slice allowed by the network or may store the S-NSSAI included in the 12th identification information as allowed NSSAI. The UE may store the allowed NSSAI until the UE receives the 12th identification information next. The UE may store the allowed NSSAI until the UE moves out of the registration area. In a case that the UE has already stored the allowed NSSAI, the UE may update the stored information to the allowed NSSAI indicated in the 12th identification information. Furthermore, in a case that the new allowed NSSAI includes the rejected S-NSSAI stored by the UE, the UE may delete the S-NSSAI from the rejected NSSAI.

Based on the reception of the 12th identification information that is empty, the UE may transition to a state in which the registration is allowed but in which establishment of a PDU session is not allowed. Specifically, based on the reception of the 12th identification information that is empty, the UE may store the registration area received as a disallowed area, or may transition to a state in which the movement restriction is performed.

Based on the reception of the 13th identification information, the UE may recognize and store the slice rejected by the network and the cause of the rejection.

For example, in a case that the UE receives the 13th identification information, based on the cause value associated with the S-NSSAI included in the 13th identification information, the UE may appropriately store, into the rejected NSSAI, the S-NSSAI included in the 13th identification information. Furthermore, in a case that the S-NSSAI included in the stored rejected NSSAI is included in the allowed NSSAI, the S-NSSAI may be deleted from the allowed NSSAI.

Furthermore, for example, in a case that the 13th identification information includes the first rejected NSSAI, in other words, in a case that the 13th identification information is configured with at least a set of pieces of S-NSSAI and a reject cause value indicating the unavailability of the S-NSSAI in the current PLMN, then based on the reject cause value, the UE may include and store the S-NSSAI in the first rejected NSSAI. Furthermore, in a case that the S-NSSAI included in the new rejected NSSAI is included in the Allowed NSSAI stored by the UE, the UE may delete the rejected NSSAI from the Allowed NSSAI.

Furthermore, for example, in a case that the 13th identification information includes the second rejected NSSAI, in other words, in a case that the 13th identification information is configured with at least a set of pieces of S-NSSAI and a reject cause value indicating the unavailability of the S-NSSAI in the current registration area, then based on the reject cause value, the UE may include and store the S-NSSAI in the second rejected NSSAI.

Furthermore, for example, in a case that the 13th identification information includes the third rejected NSSAI, in other words, in a case that the 13th identification information is configured with at least a set of pieces of S-NSSAI and a reject cause value indicating S-NSSAI made pending due to the Network slice-specific authentication and authorization, then based on the reject cause value, the UE may include and store the S-NSSAI in the third rejected NSSAI.

Furthermore, for example, in a case that the 13th identification information includes the fourth rejected NSSAI, in other words, in a case that the 13th identification information is configured with at least a set of pieces of S-NSSAI and a reject cause value indicating S-NSSAI that Network slice-specific authentication and authorization has failed, then based on the reject cause value, the UE may delete the S-NSSAI from the third rejected NSSAI and further include and store the S-NSSAI in the fourth rejected NSSAI.

Furthermore, in a case that the UE receives 13th identification information including at least one piece of S-NSSAI and that the S-NSSAI included in the new rejected NSSAI is included in the Allowed NSSAI stored by the UE, the UE may delete the rejected NSSAI from the Allowed NSSAI.

The UE may store the S-NSSAI associated with other cause values in a similar manner. Note that the method in which the UE stores the rejected NSSAI is not limited to that described above, and that the UE may store the rejected NSSAI such that the S-NSSAI is associated with the cause value.

The UE may start counting of the timer or the timer, based on the reception of the 13th identification information including the third rejected NSSAI, and/or the reject cause value included in the 13th identification information, and/or the 14th identification information. In this regard, the value of the timer may be a value stored by the UE in advance, or may be a timer value indicated by the 14th identification information.

During counting of the timer, the UE stops the timer in a case of receiving, from the network, the configuration update command or the registration accept message including the allowed NSSAI and/or the rejected NSSAI indicating the notification of result of the Network Slice-Specific Authentication and Authorization for the rejected NSSAI that is pending, or receiving the result of the Network Slice-Specific Authentication and Authorization.

In a case that counting of the timer expires, in other words, in a case that, during counting of the timer, the UE fails to receive, from the network, the configuration update command or the registration accept message or the registration reject message or the de-registration request message including the allowed NSSAI and/or the rejected NSSAI indicating the notification of result of the Network Slice-Specific Authentication and Authorization for the pending rejected NSSAI, or fails to receive the result of the Network Slice-Specific Authentication and Authorization, the UE may delete the third rejected NSSAI or delete the corresponding rejected S-NSSAI from the third rejected NSSAI.

The UE may recognize that the AMF is changed based on the reception of the 15th identification information. In a case that the UE stores the third rejected NSSAI before receiving the registration accept message, the UE may delete the third rejected NSSAI based on the reception of the 16th identification information.

In a case that the 15th identification information is information indicating the registration area, the UE may delete the third rejected NSSAI in response to a change of the registration area.

The UE may delete the third rejected NSSAI, based on the reception of the 16th identification information. Specifically, in a case that the 16th identification information is information indicating the deletion of the third rejected NSSAI, the UE may delete the third rejected NSSAI.

Note that each type of processing performed by the UE based on reception of each piece of identification information described above may be performed during the present procedure or after completion of the present procedure or may be performed based on completion of the present procedure after completion of the present procedure.

Note that the AMF may select and determine which piece of identification information out of the 11th to the 16th identification information is to be included in the registration accept message, based on each piece of received identification information, and/or subscriber information, and/or capability information of the network, and/or an operator policy, and/or a state of the network, and/or registration information of a user, and/or a context stored in the AMF, and/or the like.

The AMF can either include and transmit an SM message (for example, the PDU session establishment accept message) in the registration accept message, or transmit an SM message (for example, the PDU session establishment accept message) together with the registration accept message. However, such a transmission method may be performed in a case that the SM message (for example, the PDU session establishment request message) is included in the registration request message. Also, such a transmission method may be performed in a case that the SM message (for example, the PDU session establishment request message) is included together with the registration request message. By performing such a transmission method as described above, the AMF can indicate that a procedure for SM is accepted in the registration procedure.

By transmitting the registration accept message based on each piece of received identification information, and/or subscriber information, and/or capability information of the network, and/or an operator policy, and/or a state of the network, and/or registration information of a user, and/or a context stored in the AMF, and/or the like, the AMF may indicate that the request from the UE is accepted.

The UE receives the registration accept message via the 5G AN (gNB) (S610). By receiving the registration accept message, the UE can recognize that the request from the UE on the registration request message is accepted, and recognize details of various pieces of identification information included in the registration accept message.

The UE can further transmit to the AMF a registration complete message as a response message to the registration accept message via the 5G AN (gNB) (S610). Note that, in a case that the UE receives the SM message such as the PDU session establishment accept message, the UE may include and transmit the SM message such as the PDU session establishment complete message in the registration complete message, or may indicate that the procedure for SM has completed by including the SM message. Here, the registration complete message is a NAS message transmitted and/or received over the N1 interface; however, between the UE and the 5G AN (gNB), the registration complete message is transmitted and/or received on an RRC message.

The AMF receives the registration complete message via the 5G AN (gNB) (S612). In addition, each apparatus completes the procedure (A) in the present procedure and the registration procedure based on the transmission and/or reception of the registration accept message and/or the registration complete message.

Next, a case that the 1st condition fulfillment determination is false will be described. The AMF transmits a registration reject message as a response message to the registration request message to the UE via the 5G AN (gNB) (S614). Here, the registration reject message is a NAS message transmitted and/or received over the N1 interface; however, the registration reject message is included and transmitted and/or received in the RRC message between the UE and the 5G AN (gNB).

The new AMF may include at least one piece of identification information of the 31st and the 32nd identification information in the registration reject message to transmit. The new AMF may further include the cause value in the registration reject message to transmit. In this regard, the cause value may be 5GMM cause. Note that by transmitting these pieces of identification information and/or the registration reject message, the AMF may indicate that the network does not support each function or that the request from the UE is rejected or is not accepted, or may indicate the cause of disallowance of the request from the UE or information indicating a combination of the above-described matters. Furthermore, in a case that multiple pieces of identification information are transmitted and/or received, two or more of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

In a case that the AMF receives at least any of the 1st to the 3rd identification information from the UE and/or that the UE configuration information is updated after the previous registration procedure, the AMF may transmit at least one of the 31st and the 32nd identification information.

In a case that no S-NSSAI is available that is allowed for the UE and that no S-NSSAI is scheduled to be added to the allowed NSSAI in the future by any other procedure (for example, the Network Slice-Specific Authentication and Authorization procedure), the AMF may transmit the 32nd identification information and the registration reject message.

Based on the reception of the 31st identification information and/or the type of the present procedure (registration type), and/or the state of the UE, the UE may appropriately recognize and store the rejected S-NSSAI and the cause of the rejection.

First, a case will be described in which the present procedure is a registration procedure for initial registration. Specifically, a case will be described in which the UE includes, in the registration request message, information indicating that the present procedure is a registration procedure for initial registration.

For example, in a case of receiving the 31st identification information included in the registration reject message in the registration procedure for initial registration, the UE may include and store the S-NSSAI in an appropriate rejected NSSAI or ignore the S-NSSAI, based on the reject cause value associated with the S-NSSAI included in the 31st identification information and/or the state of the UE.

In particular, in a case that the 31st identification information includes the first rejected NSSAI, in other words, in a case that the UE is configured with at least a set of pieces of S-NSSAI and the reject cause value indicating the unavailability of the S-NSSAI in the current PLMN in the 31st identification information and further that the UE is in a state of being registered on an access different from the access requested from the current PLMN, then based on the reject cause value, the UE may include and store the S-NSSAI in the first rejected NSSAI. Furthermore, in a case that the S-NSSAI included in the new rejected NSSAI is included in the Allowed NSSAI stored by the UE, the UE may delete the rejected NSSAI from the Allowed NSSAI.

In a case that the 31st identification information includes the first rejected NSSAI, in other words, in a case that the 31st identification information is configured with at least a set of pieces of S-NSSAI and the reject cause value indicating that the unavailability of the S-NSSAI in the current PLMN and further that the UE is in a deregistered state for an access different from the requested access, then the UE may ignore the S-NSSAI.

Furthermore, for example, in a case that the 31st identification information includes the second rejected NSSAI, in other words, in a case that the 31st identification information is configured with at least a set of pieces of S-NSSAI and the reject cause value indicating the unavailability of the S-NSSAI in the current registration area, the UE may ignore the S-NSSAI.

In a case that the 31st identification information includes the third rejected NSSAI, in other words, in a case that the 31st identification information is configured with at least a set of pieces of S-NSSAI and the reject cause value indicating S-NSSAI made pending due to the Network slice-specific authentication and authorization and further that the UE is in a registered state for an access different from the requested access, then based on the reject cause value, the UE may include and store the S-NSSAI in the third rejected NSSAI. Furthermore, in a case that the S-NSSAI included in the new rejected NSSAI is included in the Allowed NSSAI stored by the UE, the UE may delete the rejected NSSAI from the Allowed NSSAI.

In a case that the 31st identification information includes the third rejected NSSAI, in other words, in a case that the 31st identification information is configured with at least a set of pieces of S-NSSAI and the reject cause value indicating S-NSSAI made pending due to the Network slice-specific authentication and authorization and further that the UE is in a deregistered state for an access different from the requested access, then the UE may ignore the S-NSSAI.

In a case that the 31st identification information includes the fourth rejected NSSAI, in other words, in a case that the 31st identification information is configured with at least a set of pieces of S-NSSAI and the reject cause value indicating S-NSSAI that Network slice-specific authentication and authorization has failed and further that the UE is in a registered state for an access different from the requested access, then based on the reject cause value, the UE may include and store the S-NSSAI in the fourth rejected NSSAI. Furthermore, in a case that the S-NSSAI included in the new rejected NSSAI is included in the Allowed NSSAI stored by the UE, the UE may delete the rejected NSSAI from the Allowed NSSAI.

In a case that the 31st identification information includes the fourth rejected NSSAI, in other words, in a case that the 31st identification information is configured with at least a set of pieces of S-NSSAI and the reject cause value indicating S-NSSAI involving the failed Network slice-specific authentication and authorization and further that the UE is in a registered state for an access different from the requested access, then based on the reject cause value, the UE may delete the S-NSSAI from the third rejected NSSAI.

In a case that the 31st identification information includes the fourth rejected NSSAI, in other words, in a case that the 31st identification information is configured with at least a set of pieces of S-NSSAI and the reject cause value indicating S-NSSAI made pending due to the Network slice-specific authentication and authorization and further that the UE is in a deregistered state for an access different from the requested access, then the UE may ignore the S-NSSAI.

Now, a case will be described in which the present procedure is a registration procedure for movement and periodic registration update.

For example, in a case that the UE receives the 31st identification information in a registration procedure for movement and periodic registration update, then based on the cause value associated with the S-NSSAI included in the 31st identification information, the UE may store, into the appropriate rejected NSSAI, the S-NSSAI included in the 31st identification information. Furthermore, in a case that the S-NSSAI included in the stored rejected NSSAI is included in the allowed NSSAI, the S-NSSAI may be deleted from the allowed NSSAI.

Furthermore, for example, in a case that the 31st identification information includes the first rejected NSSAI, in other words, in a case that the 31st identification information is configured with at least a set of pieces of S-NSSAI and the reject cause value indicating the unavailability of the S-NSSAI in the current PLMN, then based on the reject cause value, the UE may include and store the S-NSSAI in the first rejected NSSAI. Furthermore, in a case that the S-NSSAI included in the new rejected NSSAI is included in the Allowed NSSAI stored by the UE, the UE may delete the rejected NSSAI from the Allowed NSSAI.

Furthermore, for example, in a case that the 31st identification information includes the second rejected NSSAI, in other words, in a case that the 31st identification information is configured with at least a set of pieces of S-NSSAI and the reject cause value indicating the unavailability of the S-NSSAI in the current registration area, then based on the reject cause value, the UE may include and store the S-NSSAI in the second rejected NSSAI.

Furthermore, for example, in a case that the 31st identification information includes the third rejected NSSAI, in other words, in a case that the 31st identification information is configured with at least a set of pieces of S-NSSAI and the reject cause value indicating S-NSSAI made pending due to the Network slice-specific authentication and authorization, then based on the reject cause value, the UE may include and store the S-NSSAI in the third rejected NSSAI.

Furthermore, for example, in a case that the 31st identification information includes the fourth rejected NSSAI, in other words, in a case that the 31st identification information is configured with at least a set of pieces of S-NSSAI and a reject cause value indicating S-NSSAI indicating the failed Network slice-specific authentication and authorization, then based on the reject cause value, the UE may delete the S-NSSAI from the third rejected NSSAI and further include and store the S-NSSAI in the fourth rejected NSSAI.

Furthermore, in a case that the UE receives the 31st identification information including at least one piece of S-NSSAI and that the S-NSSAI included in the new rejected NSSAI is included in an Allowed NSSAI stored by the UE, the UE may delete the rejected NSSAI from the Allowed NSSAI.

In other words, in the registration procedure for initial registration, in a case that the UE receives, from the core network, the registration reject message including the 31st identification information and further that the 31st identification information includes S-NSSAI and the reject cause value indicating the unavailability of the S-NSSAI in the current registration area, then the UE may ignore the S-NSSAI.

Furthermore, in the registration procedure for initial registration for one access, in a case that the UE receives, from the core network, the registration reject message including the 31st identification information and further that the UE is in the deregistered state for the other access and further that the 31st identification information includes S-NSSAI and the reject cause value indicating that the associated S-NSSAI is not available in the current PLMN, and/or is S-NSSAI made pending due to the Network slice-specific authentication and authorization, and/or is S-NSSAI involving the failed Network slice-specific authentication and authorization, then UE may ignore the S-NSSAI.

Furthermore, in the registration procedure for initial registration, based on the cause of the rejection, the UE may otherwise provide additional storage in the corresponding rejected NSSAI, or delete, from the allowed NSSAI stored by the UE, the S-NSSAI included in the rejected NSSAI stored by the UE, if any.

In the registration procedure for movement and periodic registration update, in a case that the UE receives the 31st identification information, then regardless of the reject cause value associated with the S-NSSAI included in the 31st identification information and the state of the UE and based on the associated cause of the rejection, the UE may additionally store, into the appropriate rejected NSSAI, the S-NSSAI included in the 31st identification information, and may delete, from the allowed NSSAI stored by the UE, the S-NSSAI included in the rejected NSSAI stored by the UE, if any.

In a case of receiving the 32nd identification information, the UE may delete the Allowed NSSAI for the access (3GPP access or non-3GPP access) requested by the UE.

The UE may store the S-NSSAI associated with other cause values in a similar manner. Note that the method in which the UE stores the rejected NSSAI is not limited to that described above, and that the UE may store the rejected NSSAI such that the S-NSSAI is associated with the cause value.

Note that each type of processing performed by the UE based on reception of each piece of identification information described above may be performed during the present procedure or after completion of the present procedure or may be performed based on completion of the present procedure after completion of the present procedure.

Note that the AMF may select and determine whether to include at least one of the 31st and the 32nd identification information in the registration reject message based on each piece of identification information received, and/or the subscriber information, and/or the capability information of the network, and/or the operator policy, and/or the state of the network, and/or the registration information of the user, and/or the context stored in the AMF, and/or the like.

Specifically, in the registration procedure for initial registration, the AMF need not transmit the registration reject message including the 31st identification information including the reject cause value indicating the unavailability in the current registration area, or may be controlled not to transmit the registration reject message.

Furthermore, in the registration procedure for initial registration for one access, in a case that the UE is not registered for the other access, the AMF need not transmit, via the one access, the registration reject message including the 31st identification information including the reject cause value indicating the unavailability in the current PLMN, and/or the reject cause value indicating S-NSSAI made pending due to the Network slice-specific authentication and authorization, and/or the reject cause value indicating S-NSSAI involving the failed Network slice-specific authentication and authorization, or the AMF may be controlled to operate as described above.

The UE receives the registration reject message via the 5G AN (gNB). The UE can recognize that the request from the UE using the registration request message has been rejected and the content of various kinds of identification information included in the registration reject message by receiving the registration reject message. In a case that the UE does not receive the registration accept message or the registration reject message even after a prescribed time period has elapsed after transmitting the registration request message, the UE may recognize that the request from the UE is rejected. Each apparatus may complete the registration procedure based on the transmission and/or reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE is not registered with the network on the access via which the UE has received the registration reject message for the current PLMN (an RM_DEREGISTERED state or a 5GMM-DEREGISTERED state) based on the transmission and/or reception of the registration reject message. The transition of each apparatus to each state may be based on the transmission and/or reception of the registration complete message or the completion of the registration procedure.

In addition, each apparatus may perform processing based on information transmitted and/or received in the registration procedure based on completion of the registration procedure. For example, in a case that information indicating that a part of the request from the UE is rejected is transmitted and/or received, a reason of rejection of the request from the UE may be recognized. In addition, each apparatus may perform the present procedure again or may perform the registration procedure on the core network_A or another cell based on the cause for the rejection of the request from the UE.

Moreover, the UE may store the identification information received together with the registration accept message and/or the registration reject message or may recognize determination of the network, based on the completion of the registration procedure.

Furthermore, each apparatus may initiate the Network Slice-Specific Authentication and Authorization procedure and the UE configuration update procedure based on the completion of the registration procedure. Note that the details of the Network Slice-Specific Authentication and Authorization procedure and the UE configuration update procedure will be described later.

3.3. Network Slice-Specific Authentication and Authorization Procedure

Figure 7:
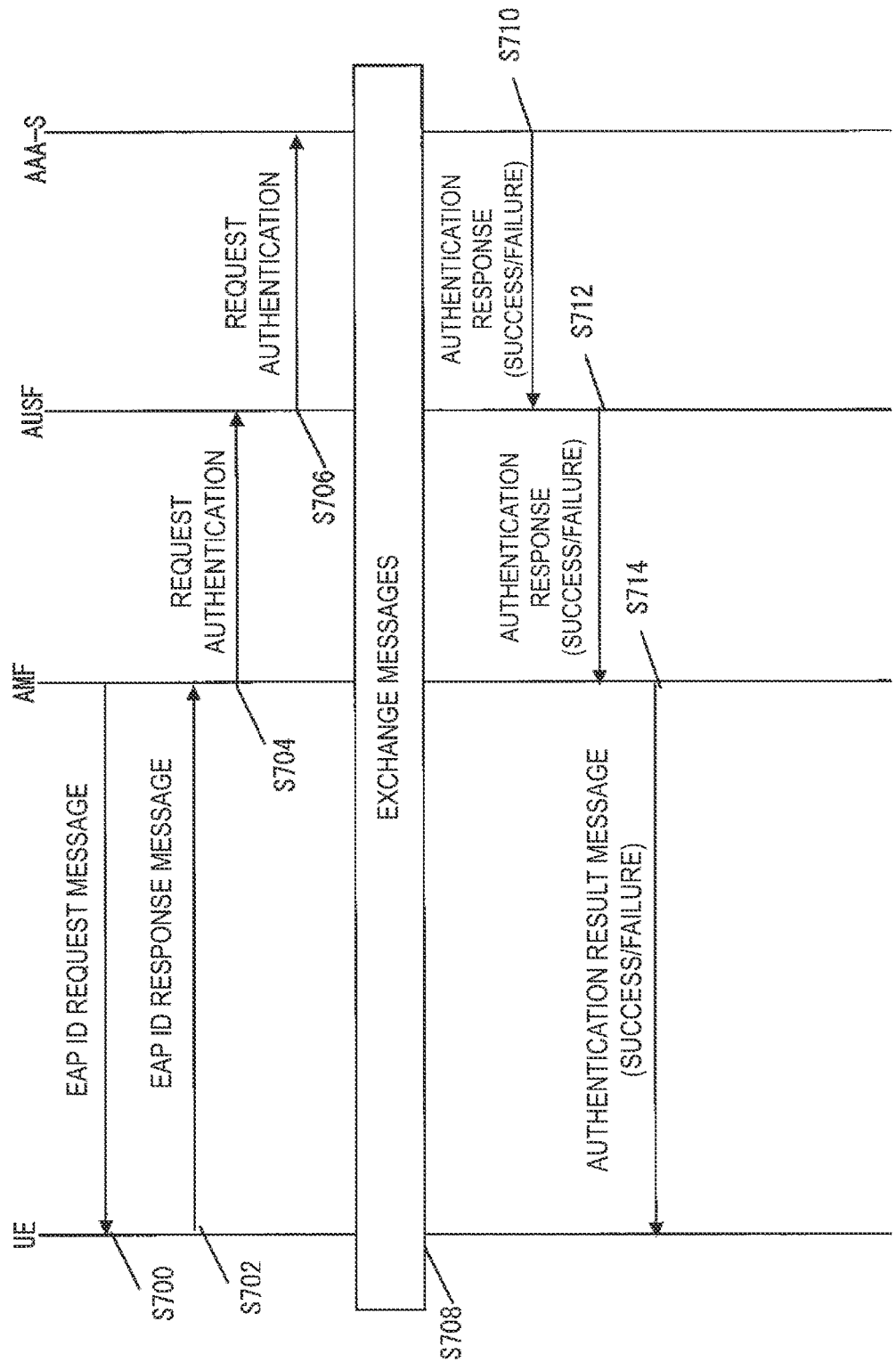
FIG. 7 is a diagram illustrating a Network Slice specific authentication and authorization procedure.

Now, the Network Slice-Specific Authentication and Authorization procedure will be described using FIG. 7. Hereinafter, the Network Slice-Specific Authentication and Authorization procedure is also referred to as the present procedure. The present procedure may be a procedure for performing, by the core network, an authentication and authorization procedure for a slice requiring the Network Slice-Specific Authentication and Authorization procedure for the UE.

The present procedure may be initiated by the AMF. For example, the AMF may initiate the present procedure based on the reception of the registration request message from the UE. The AMF may initiate the present procedure in a case that at least one piece of S-NSSAI requested by the UE is stored as S-NSSAI requiring the Network Slice-Specific Authentication and Authorization procedure and further that the result of the Network Slice-Specific Authentication and Authorization for the S-NSSAI is not stored.

Alternatively, the AMF may initiate the present procedure based on a request from the AAA-S. For example, in a case that with the AMF managing a certain piece of S-NSSAI as allowed NSSAI as a result of the Network Slice-Specific Authentication and Authorization being performed on the S-NSSAI at least once, the AAA-S request re-performance of the Network Slice-Specific Authentication and Authorization on the S-NSSAI, then the AMF may initiate the present procedure based on the request from the AAA-S. In this case, the present procedure may be a Network Slice-Specific Authentication and Authorization procedure initiated by the AAA-S.

Hereinafter, the present procedure will be described. The AMF transmits an EAP ID request message to the UE via the 5G AN (or gNB or non-3GPP access) (S700). The EAP ID request message may be included in the Authentication request message, corresponding to an NAS message to transmit. The AMF includes one or multiple pieces of S-NSSAI corresponding to the requested EAP ID in the EAP ID request message or the authentication request message including the EAP ID request message to transmit.

The AMF requests to the UE, based on the transmission of the EAP ID request message, one or multiple EAP IDs as identification information for the UE used to perform the Network Slice-Specific Authentication and Authorization for one or multiple pieces of S-NSSAI.

The UE transmits an EAP ID response message based on the reception of the EAP ID request message and/or the reception of the S-NSSAI (S702). The EAP ID response message may be included in the Authentication response message, which is an NAS message, to transmit. The UE includes the S-NSSAI received from the AMF in the EAP ID response message or the authentication request message including the EAP ID response message to transmit. The UE includes, in the EAP ID response message, the EAP ID being identification information of the UE corresponding to the S-NSSAI received from the AMF to transmit. Note that the UE may include multiple EAP IDs and multiple pieces of S-NSSAI in the EAP ID response message, and each EAP ID and each S-NSSAI may be associated with each other to transmit.

Based on the EAP ID response message from the UE and/or the reception of the EAP ID, the AMF transmits the authentication request message to the AAA-S via the AUSF (S704 and S706). The AMF may include, in the authentication request message, the EAP ID response message received from the UE, and transmit the authentication request message to the AUSF and/or the AAA-S, or may include, in the authentication request message, the EAP ID and/or the S-NSSAI included in the EAP ID response message received from the UE, and may transmit the authentication request message to the AUSF and/or AAA-S.

Note that the authentication request message transmitted from the AMF to the AUSF may be the same as or may be different from the authentication request message transmitted to the AAA-S from the AUSF. Specifically, the AUSF may transfer, to the AAA-S, the authentication request message received from the AMF, or may include, in the authentication request message, the EAP ID and/or the S-NSSAI included in the authentication request message received from the AMF and transmit the authentication request message to the AAA-S.

Based on the reception of the authentication request message, the AAA-S may initiate a procedure of exchanging, between the UE and the AAA-S, a message required for authentication (S708). Note that the message used in the procedure of exchanging the message between the AAA-S and the UE may be an EAP message.

The AAA-S performs the authentication procedure, based on the reception of the authentication request message received from the AMF via the AUSF. In response to the authentication request message received from the AMF, the AAA-S transmits the authentication response message to the AMF via the AUSF (S710 and S712). The AUSF includes an authentication result and S-NSSAI in the authentication response message, and transmits the authentication response message. In this regard, the authentication result may be information indicating success or failure.

Based on the reception of the authentication response message, the AMF transmits the Authentication result message to the UE (S714). The AMF may include, in the authentication response message, the authentication response message or the authentication result and the S-NSSAI included in the authentication response message to transmit.

Each apparatus may complete the present procedure, based on the transmission and/or reception of an authentication result message. Based on the completion of the present procedure, each apparatus may update the stored information, based on the information transmitted and/or received in the present procedure. Specifically, the AMF may store the authentication result for each piece of S-NSSAI, based on the transmission and/or reception of the authentication result. For example, in a case of transmitting and/or receiving "success" as the authentication result, the AMF may store, as information regarding the UE, information indicating a state of "success" on the Network Slice-Specific Authentication and Authorization, in association with the S-NSSAI transmitted and/or received together with the authentication result. Similarly, in a case of transmitting and/or receiving "failure" as the authentication result, the AMF may store, as information regarding the UE, information indicating a state of "failure" on the Network Slice-Specific Authentication and Authorization, in association with the S-NSSAI transmitted and/or received together with the authentication result.

In a case that the present procedure is a procedure initiated based on the reception of the registration request message from the UE, the AMF may update the allowed NSSAI and/or the rejected NSSAI for the UE, based on the transmission and/or reception of the authentication result. Specifically, for example, in a case of transmitting and/or receiving "success" as the authentication result, the AMF may store, as the allowed NSSAI, the S-NSSAI transmitted and/or received together with the authentication result, or may store the S-NSSAI associated with "allowed". Similarly, in a case of transmitting and/or receiving "failure" as the authentication result, the AMF may store, as the rejected NSSAI, the S-NSSAI transmitted and/or received together with the authentication result, or may store the S-NSSAI associated with "rejected". Furthermore, in a case that the AMF transmits and/or receives "failure" as the authentication result and further stores the third rejected NSSAI including the S-NSSAI transmitted and/or received by the UE together with the authentication result, the UE may delete the S-NSSAI from the third rejected NSSAI.

Based on the transmission and/or reception of the authentication result, the UE may store the authentication result for each piece of S-NSSAI. Specifically, for example, in a case of transmitting and/or receiving "success" as the authentication result, the UE may store, as information regarding the UE, information indicating a state of "success" on the Network Slice-Specific Authentication and Authorization, in association with the S-NSSAI transmitted and/or received together with the authentication result. Similarly, in a case of transmitting and/or receiving "failure" as the authentication result, the UE may store, as information regarding the UE, information indicating a state of "failure" on the Network Slice-Specific Authentication and Authorization, in association with the S-NSSAI transmitted and/or received together with the authentication result.

Based on the completion of the present procedure, each apparatus may perform processing based on update of the stored information. For example, based on the completion of the present procedure, the AFM may initiate the UE configuration update procedure in a case that the S-NSSAI included in the allowed NSSAI and/or the rejected NSSAI for the UE is changed. The AMF may use the UE configuration update procedure to notify the UE of new allowed NSSAI and new rejected NSSAI.

3.4. UE Configuration Update Procedure

Figure 8:
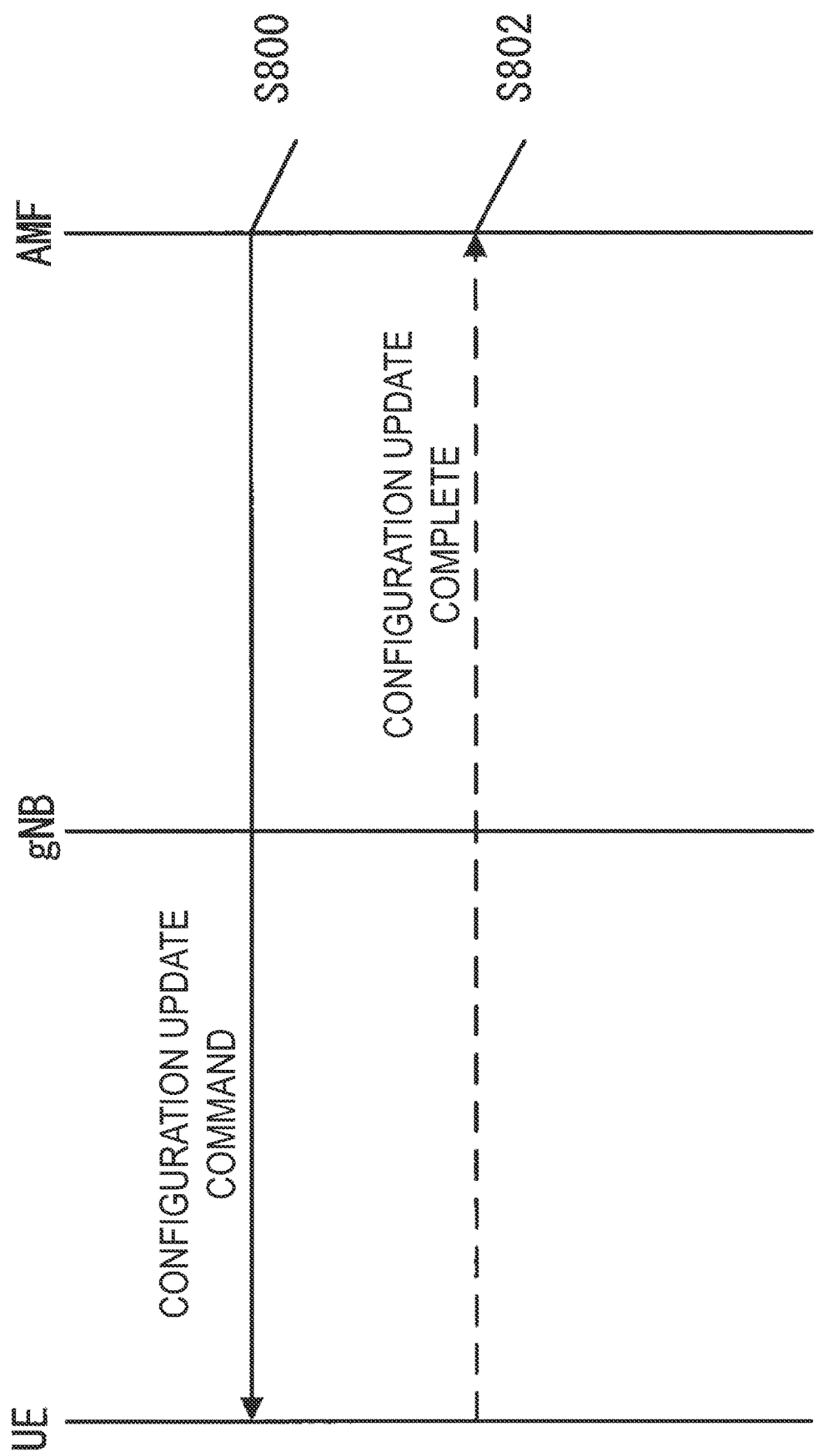
FIG. 8 is a diagram illustrating a UE configuration modification/update procedure.

Next, the UE configuration update procedure (Generic UE configuration update procedure) will be described with reference to FIG. 8. The UE configuration update procedure is hereinafter also referred to as the present procedure. The present procedure is a procedure for the core network to update configuration information of the UE. The present procedure may be a procedure for mobility management that is initiated by the network with respect to the UE registered with the network.

In addition, the apparatus in the core network, such as the AMF, may initiate the present procedure, based on update of a configuration of the network and/or update of an operator policy. Note that a trigger of the present procedure may be detection of mobility of the UE, may be detection of state change of the UE, and/or the access network, and/or the core network, or may be state change of the network slice. In addition, the trigger of the present procedure may be reception of a request from the DN and/or an application server of the DN, change of a configuration of the network, or may be change of an operator policy. Furthermore, the trigger of the present procedure may be expiration of the running timer. Note that the trigger for the apparatus in the core network to initiate the present procedure is not limited to these. In other words, the present procedure may be performed at any timing after the above-described registration procedure and/or PDU session establishment procedure completes. In addition, the present procedure may be performed at any timing on the condition that each apparatus is in a state in which each apparatus has established a 5GMM context and/or each apparatus is in a state in which each apparatus is in the 5GMM connected mode.

During the present procedure, each apparatus may transmit and/or receive a message including identification information for changing configuration information of the UE and/or identification information for stopping or changing the function being performed by the UE. In addition, based on completion of the present procedure, each apparatus may update the configuration information to a configuration indicated by the network, or may start behavior indicated by the network.

The UE may update the configuration information of the UE, based on the control information transmitted and/or received in the present procedure. In addition, the UE may stop the function being performed, or may start a new function, along with the update of the configuration information of the UE. In other words, the apparatus in the core network may initiate the present procedure and further transmit a control message and control information of the present procedure to the UE so as to cause the UE to update the configuration information of the UE that can be identified using these pieces of control information. In addition, by causing update of the configuration information of the UE, the apparatus in the core network may cause stop of the function being performed by the UE, or may cause the UE to start a new function.

First, the AMF transmits the Configuration update command message to the UE via the 5G AN (or the gNB) (S800), and thereby initiates the UE configuration update procedure.

The AMF may include one or more of the 21st to the 25th identification information in the configuration update command message to transmit. Note that, by transmitting one or more of the 21st to the 25th identification information, the AMF may indicate new UE configuration information, or may request update of the UE configuration information. Note that information indicating support of each function and information indicating a request for use of each function may be transmitted and/or received as the same piece of identification information, or may be transmitted and/or received as different pieces of identification information.

Furthermore, in a case that multiple pieces of identification information are transmitted and/or received, two or more of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Note that the AMF may select and determine whether to include the 21st to the 25th identification information in the configuration update command message, based on each piece of identification information received, and/or the subscriber information, and/or the capability information of the network, and/or the operator policy, and/or the state of the network, and/or the registration information of the user, and/or the context stored in the AMF, and/or the like.

By transmitting the configuration update command message based on each piece of received identification information, and/or subscriber information, and/or capability information of the network, and/or an operator policy, and/or a state of the network, and/or registration information of a user, and/or a context stored in the AMF, and/or the like, the AMF may indicate a request for update of the configuration information of the UE.

The UE receives the configuration update command message via the 5G AN (or gNB) (S800). The UE may update the configuration information of the UE, based on the configuration update command message, and/or identification information included in the configuration update command message.

By receiving the 21st identification information, the UE may update the allowed NSSAI stored by the UE. Specifically, the UE may change the stored information by using the 21st identification information received as new allowed NSSAI.

The UE may update the rejected NSSAI stored by the UE by receiving the 22nd identification information. Specifically, in a case of receiving the 22nd identification information, the UE may add the rejected NSSAI included in the 22nd identification information to the rejected NSSAI stored by the UE, or update the rejected NSSAI stored by the UE to the rejected NSSAI included in the 22nd identification information.

For example, in a case that the 22nd identification information includes at least S-NSSAI and a cause value and further that the UE already manages the rejected NSSAI, the UE may store the S-NSSAI included in the 22nd identification information added to the rejected NSSAI already stored by the UE without deleting the rejected NSSAI already stored. Alternatively, the UE may delete the already stored rejected NSSAI, and store, as the rejected NSSAI, the S-NSSAI included in the 22nd identification information.

Based on the reception of the 25th identification information, the UE may initiate the registration procedure after the completion of the present procedure. The registration procedure initiated by the UE may be the registration procedure described in Chapter 3.

Note that each type of processing performed by the UE based on reception of each piece of identification information described above may be performed during the present procedure or after completion of the present procedure or may be performed based on completion of the present procedure after completion of the present procedure. Furthermore, the UE may transmit a Configuration update complete message to the AMF via the 5G AN (gNB) as a response message to the configuration update command message, based on the identification information included in the configuration update command message (S802).

In a case that the UE transmits the configuration update complete command message, the AMF receives the configuration update complete message via the 5G AN (gNB) (S802). Each apparatus completes the present procedure, based on transmission and/or reception of the configuration update command message and/or the configuration update complete message.

In addition, based on completion of the present procedure, each apparatus may perform processing based on information transmitted and/or received in the present procedure. For example, in a case that update information for configuration information is transmitted and/or received, each apparatus may update the configuration information. In addition, in a case that information indicating that the registration procedure needs to be performed is transmitted and/or received, the UE may initiate the registration procedure, based on completion of the present procedure.

In addition, based on completion of the present procedure, the UE may store identification information received together with the configuration information command message, or may recognize determination of the network. Based on the completion of the present procedure, the UE may perform each procedure based on the stored information.

In the above-described procedure, by transmitting and/or receiving the configuration update command message, the apparatuses in the core network can indicate to the UE to update the configuration information already applied by the UE and indicate to the UE to stop or change the function performed by the UE.

3.5. De-registration Procedure Initiated by Network

Figure 9:
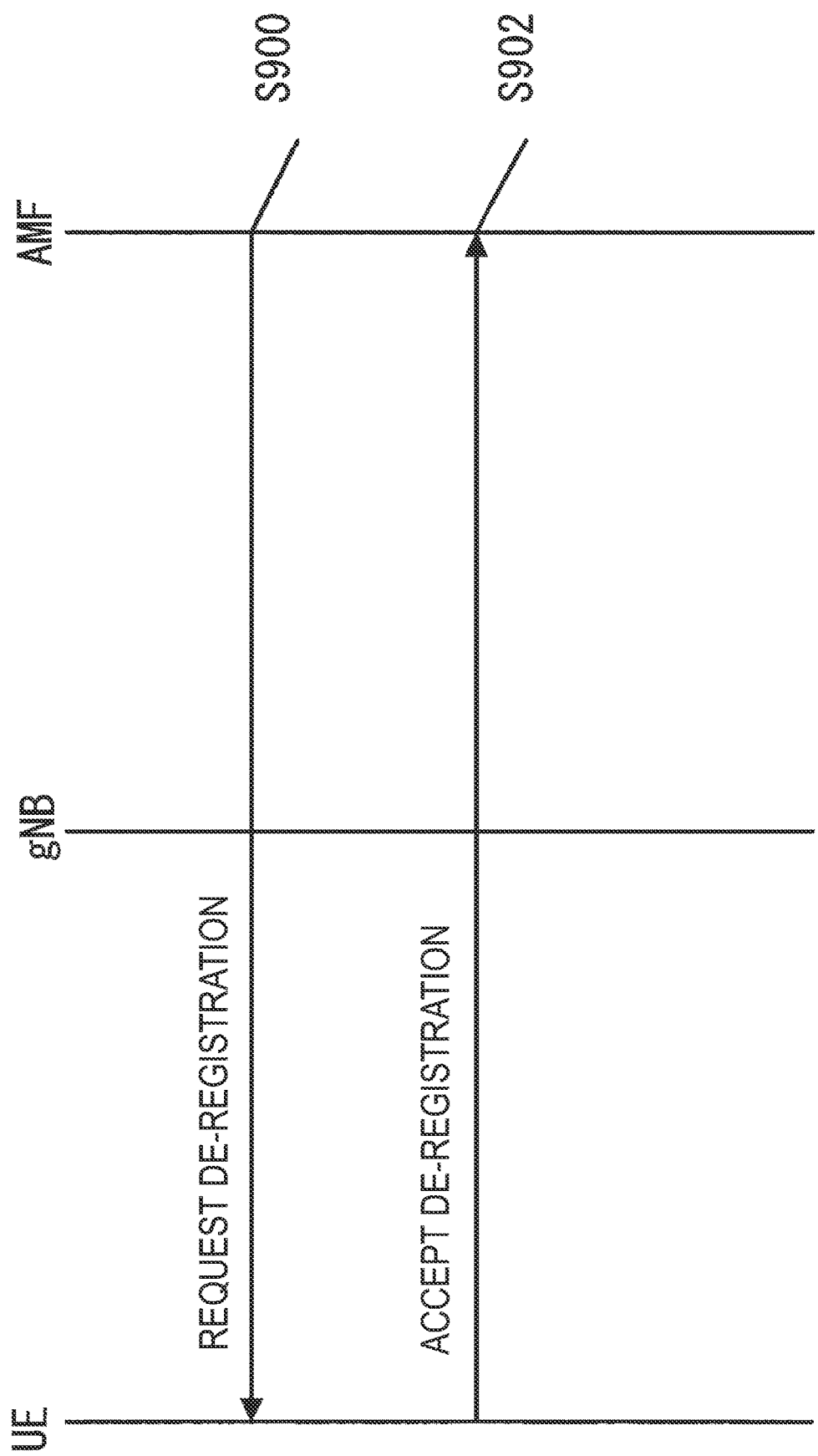
FIG. 9 is a diagram illustrating a de-registration procedure initiated by a network.

Now, a Network-initiated de-registration procedure will be described by using FIG. 9. Hereinafter, the present procedure will refer to the Network-initiated de-registration procedure. The Network-initiated de-registration procedure is a procedure for de-registering with the access network_A, and/or the core network_A, the access network_B, and/or the core network_B, and/or the DN, and/or the PDN, the procedure being manually activated by the network. The present procedure may be a procedure for mobility management that is initiated by the network with respect to the UE registered with the network.

The AMF can perform the present procedure at any timing as long as the UE is in a state of being registered with the network (RM-REGISTERED state or 5GMM-REGISTERED state). For example, the AMF may initiate the present procedure in response to the update of the registration information of the UE. More specifically, based on the completion of the Network Slice-Specific Authentication and Authorization procedure, the AMF may initiate the present procedure in a case that the UE registration information lacks allowed NSSAI. In other words, the AMF may initiate the present procedure in a case that no S-NSSAI is available that is allowed for the UE and that no S-NSSAI is scheduled to be added to the allowed NSSAI in the future by any other procedure (for example, the Network Slice-Specific Authentication and Authorization procedure).

Note that, as an initial state, the UE and each apparatus may be in a state of storing at least one of the first to the fourth rejected NSSAI.

First, the AMF may initiate the present procedure by transmitting (S900) a De-registration request message to the UE (S900). In this regard, the De-registration request message is a NAS message transmitted and/or received on the N1 interface. However, between the UE and the 5G AN (gNB), the De-registration reject message is included in the RRC message to transmit and/or reception.

The AMF may include at least one piece of identification information of the 41st to the 43th identification information in the de-registration request message to transmit. The AMF may further include a cause value and/or information indicating the access type for de-registration, in the de-registration request message to transmit. In this regard, the cause value may be 5GMM cause.

Note that by transmitting these pieces of identification information and/or the de-registration message, the AMF may indicate that the network does not support each function, or request a transition to the deregistered state, or notify a change of the AMF, or subsequently indicate initiation of the registration procedure, or indicate information obtained by combing the above-described pieces of information. Furthermore, in a case that multiple pieces of identification information are transmitted and/or received, two or more of these pieces of identification information may be configured as one or more pieces of identification information. Note that information indicating support of each function and information indicating a request for use of each function may be transmitted and/or received as the same piece of identification information, or may be transmitted and/or received as different pieces of identification information.

Based on the reception of at least one of the 41st to the 43rd identification information and/or on the state of the UE, the UE may recognize and store the rejected S-NSSAI and the cause of the rejection.

In a case that the UE receives the 41st identification information included in the de-registration request message, then based on the cause value associated with the S-NSSAI included in the 41st identification information and/or the state of the UE, the UE may include and store the S-NSSAI in the appropriate rejected NSSAI, or ignore the S-NSSAI, or appropriately delete or update the NSSAI stored by the UE.

Specifically, in a case that the UE transitions to the deregistered state for the current PLMN on both the 3GPP access and the non-3GPP access, the UE may delete the first rejected NSSAI, the third rejected NSSAI, and the fourth rejected NSSAI, if any.

Note that based on the completion of the de-registration procedure for both the 3GPP access and the non-3GPP access, or the transmission and/or reception of messages during the de-registration procedure, the UE may transition to the deregistered state on the both access for the current PLMN or may ignore the S-NSSAI included in the first to the fourth rejected NSSAI (if any) included in the de-registration request message.

Alternatively, in a case that the UE is already in the deregistered state on only one access (A) of the 3GPP access or the non-3GPP access for the current PLMN, then based on the completion of the de-registration procedure for the other access (B), or the transmission and/or reception of messages during the de-registration procedure, the UE may transition to the deregistered state for the current PLMN on the access (B) and ignore the S-NSSAI included in the first to the fourth rejected NSSAI (if any) included in the de-registration request message.

In the de-registration procedure, in a case that the UE receives the de-registration request message including the 41st identification information and that the de-registration procedure is intended for one access (B) of the 3GPP access or the non-3GPP access and further that the UE is in a state of being registered with the current PLMN on the other access (A), then the UE may store the S-NSSAI included in the 41st identification information as the appropriate NSSAI based on the corresponding reject cause value. However, in a case that the corresponding reject cause value is information indicating S-NSSAI that is not available in the current registration area, the UE may ignore the S-NSSAI received and delete the stored second rejected NSSAI regardless of whether the UE is in the registered state or the deregistered state for the other access.

More specifically, in a case that the 41st identification information includes the first rejected NSSAI, in other words, in a case that the 41st identification information is configured with at least a set of pieces of S-NSSAI and the reject cause value indicating that the unavailability of the S-NSSAI in the current PLMN and further that the 43rd identification information is information indicating the 3GPP access or the non-3GPP access and further that the UE is in the registered state for the other access, then the UE may include and store the S-NSSAI in the first rejected NSSAI. Furthermore, in a case that the S-NSSAI included in the new rejected NSSAI is included in the Allowed NSSAI stored by the UE, the UE may delete the rejected NSSAI from the Allowed NSSAI.

In a case that the 41st identification information includes the first rejected NSSAI, in other words, in a case that the 41st identification information is configured with at least a set of pieces of S-NSSAI and the reject cause value indicating the unavailability of the S-NSSAI in the current PLMN and further that the UE transitions to the deregistered state for all accesses based on the reception of the de-registration request message, then the UE may ignore the S-NSSAI.

Note that the case where the UE transitions to the deregistered state for all the accesses based on the reception of the de-registration request message may be a case where the de-registration request message includes information indicating both accesses as information indicating the access type for de-registration, or a case where the de-registration request message includes information indicating the 3GPP access or the non-3GPP access as information indicating the access type for de-registration and where the UE is in the deregistered state for the other access.

Furthermore, for example, in a case that the 41st identification information includes the second rejected NSSAI, in other words, in a case that the 41st identification information is configured with at least a set of pieces of S-NSSAI and the reject cause value indicating the unavailability of the S-NSSAI in the current registration area, the UE may ignore the S-NSSAI.

In a case that the 41st identification information includes the third rejected NSSAI, in other words, in a case that the 41st identification information is configured with at least a set of pieces of S-NSSAI and the reject cause value indicating S-NSSAI made pending due to the Network slice-specific authentication and authorization and that the 43rd identification information is information indicating the 3GPP access or the non-3GPP access and further that the UE is in the registered state for the other access, the UE may include and store the S-NSSAI in the third rejected NSSAI. Furthermore, in a case that the S-NSSAI included in the new rejected NSSAI is included in the Allowed NSSAI stored by the UE, the UE may delete the rejected NSSAI from the Allowed NSSAI.

In a case that the 41st identification information includes the 3rd rejected NSSAI, in other words, the 41st identification information is configured with at least a set of pieces of S-NSSAI and the reject cause value indicating S-NSSAI made pending due to the Network slice-specific authentication and authorization and further that the UE transitions to the deregistered state for all the accesses based on the reception of the de-registration request message, the UE may ignore the S-NSSAI.

In a case that the 41st identification information includes the 4th rejected NSSAI, in other words, in a case that the 41st identification information is configured with at least a set of pieces of S-NSSAI and a reject cause value indicating S-NSSAI not available due to the failed or revoked Network slice-specific authentication and authorization and further that the 43rd identification information is information indicating the 3GPP access or the non-3GPP access and further that the UE is in the registered state on the other access for the same PLMN, the UE may include and store the S-NSSAI in the fourth rejected NSSAI. Furthermore, in a case that the S-NSSAI included in the new rejected NSSAI is included in the Allowed NSSAI stored by the UE, the UE may delete the rejected NSSAI from the Allowed NSSAI.

In other words, in a case that the 41st identification information includes the fourth rejected NSSAI and further that 43rd identification information is information indicating the 3GPP access and further that the UE is in the registered state on the non-3GPP access for the same PLMN, the UE may include and store the S-NSSAI in the fourth rejected NSSAI. Furthermore, in a case that the S-NSSAI included in the new rejected NSSAI is included in the Allowed NSSAI stored by the UE, the UE may delete the rejected NSSAI from the Allowed NSSAI. Alternatively, in a case that the 41st identification information includes the fourth rejected NSSAI and further that 43rd identification information is information indicating the non-3GPP access and further that the UE is in the registered state on the 3GPP access for the same PLMN, the UE may include and store the S-NSSAI in the fourth rejected NSSAI. Furthermore, in a case that the S-NSSAI included in the new rejected NSSAI is included in the Allowed NSSAI stored by the UE, the UE may delete the rejected NSSAI from the Allowed NSSAI.

In a case that the 41st identification information includes the fourth rejected NSSAI, in other words, in a case that the 41st identification information is configured with at least a set of pieces of S-NSSAI and the reject cause value indicating S-NSSAI and S-NSSAI involving the failed the Network slice-specific authentication and authorization and further that the de-registration procedure is intended for both the 3GPP access and the non-3GPP access, then the UE may ignore the rejected S-NSSAI.

In the Network-initiated de-registration procedure, in a case that the de-registration request message including the 41st identification information is received from the core network and further that the 41st identification information includes S-NSSAI and the reject cause value indicating the unavailability of the S-NSSAI in the current registration area, the rejected N-SSAI may be ignored regardless of the access type indicated by the 43rd identification information.

Furthermore, in the Network-initiated de-registration procedure, in a case that the de-registration request message including the 41st identification information is received from the core network and further that the de-registration procedure is intended for both the 3GPP access and the non-3GPP access and further that the 41st identification information includes S-NSSAI and a reject cause value indicating that the associated S-NSSAI is not available in the current PLMN, and/or that the S-NSSAI is made pending due to the Network slice-specific authentication and authorization, and/or that the S-NSSAI has failed the Network slice-specific authentication and authorization, then the UE may ignore the S-NSSAI.

Furthermore, in the Network-initiated de-registration procedure, based on the cause of the rejection included in the 41st identification information, the UE may otherwise additionally store the S-NSSAI corresponding to the appropriate rejected NSSAI, or delete, from the allowed NSSAI stored by the UE, the S-NSSAI included in the rejected NSSAI stored by the UE, if any.

In other words, in the Network-initiated de-registration procedure, in a case that the de-registration request procedure is a procedure intended for only the 3GPP access in the 5GS and further that the UE is in the deregistered state for the current PLMN on the non-3GPP access, then based on the reject cause value corresponding to the S-NSSAI, the UE may additionally store, into the appropriate rejected NSSAI or NSSAI, the S-NSSAI included in the 41 st identification information.

Note that a specific example of the method of determining the appropriate rejected NSSAI will be described below. For example, in a case that the reject cause value is information indicating the "S-NSSAI not available in the current PLMN," the appropriate rejected NSSAI may be the first rejected NSSAI. For example, in a case that the reject cause value is information indicating the "S-NSSAI not available in the current registration area," the appropriate rejected NSSAI may be the second rejected NSSAI.

For example, in a case that the reject cause value is information indicating the "S-NSSAI made pending due to the Network slice-specific authentication and authorization," the appropriate rejected NSSAI may be the third rejected NSSAI. For example, in a case that the reject cause value is information indicating the "S-NSSAI not available due to the failed or revoked Network slice-specific authentication and authorization," the appropriate rejected NSSAI may be the fourth rejected NSSAI.

In the Network-initiated de-registration procedure, in a case that the UE receives the 41 st identification information and that based on the reception of the de-registration request message, the UE transitions to the deregistered state for none of the accesses, then regardless of the reject cause value associated with the S-NSSAI included in the 41st identification information and based on the associated cause of the rejection, the UE may additionally store, into the appropriate rejected NSSAI, the S-NSSAI included in the 41st identification information, or may delete, from the allowed NSSAI stored by the UE, the S-NSSAI included in the rejected NSSAI stored by the UE, if any.

In a case of receiving the 42nd identification information, the UE may delete the Allowed NSSAI for access causing a transition to the deregistered state. Specifically, in a case of receiving the de-registration request message including the 42nd identification information and the information indicating the 3GPP access, the UE may delete the Allowed NSSAI for the 3GPP access from storage. In a case of receiving the de-registration request message including the 42nd identification information and the information indicating the non-3GPP access, the UE may delete the Allowed NSSAI for the non-3GPP access from storage. In a case of receiving the de-registration request message including the 42nd identification information and the information indicating both accesses, the UE may delete the stored Allowed NSSAI from storage.

The UE may store the S-NSSAI associated with other cause values in a similar manner. Note that the method in which the UE stores the rejected NSSAI is not limited to that described above, and that the UE may store the rejected NSSAI such that the S-NSSAI is associated with the cause value.

Note that the AMF may select and determine whether to include at least one piece of identification information of the 41st to the 43rd identification information in the de-registration request message, based on the subscriber information, and/or the capability information of the network, and/or the operator policy, and/or the state of the network, and/or the registration information of the user, and/or the context stored in the AMF, and/or the like.

Specifically, the AMF need not include, in the de-registration request message, the 41st identification information including the reject cause value indicating the unavailability in the current registration area, or may be controlled not to include the 41st identification information.

In a case of including the 43rd identification information indicating both accesses, in the de-registration request message, as identification information indicating the access type for de-registration, the AMF need not include the 41st identification information in the de-registration request message.

In a case that the AMF includes the 43rd identification information indicating the 3GPP access or the non-3GPP access, in the de-registration request message, as information indicating the access type for de-registration and further that the registration state on the other access is the deregistered state, the AMF need not include the 41st identification information in the de-registration request message.

In other words, in a case that the AMF includes the 43rd identification information indicating the 3GPP access, in the de-registration request message as information indicating the access type for de-registration and further that the registration state on the non-3GPP access is the deregistered state, the AMF need not include the 41st identification information in the de-registration request message. Alternatively, in a case that the AMF includes the 43rd identification information indicating the non-3GPP access, in the de-registration request message, as information indicating the access type for de-registration and further that the registration state on the 3GPP access is the deregistered state, the AMF need not include the 41st identification information in the de-registration request message.

The UE receives the de-registration request message via the 5G AN (gNB). The UE receives the de-registration request message to recognize the contents of various types of identification information included in the de-registration request message.

In response to the reception of the de-registration request message, the UE may transmit the de-registration accept message (DEREGISTRATION ACCEPT message) to the AMF via the 5G AN (or gNB). Note that the de-registration accept message is a NAS message transmitted and/or received over the N1 interface. The RRC message may be a control message transmitted and/or received between the UE and the 5G AN (or the gNB).

Note that each apparatus may transition to a state in which the UE is not registered with the network (an RM_DEREGISTERED state or a 5GMM-DEREGISTERED state) based on the transmission and/or reception of the registration accept message. The transition of each apparatus to each state may be based on the completion of the present procedure.

Furthermore, each apparatus may perform processing based on the information transmitted and/or received in the present procedure based on the completion of the de-registration procedure. For example, the UE may initiate the registration procedure based on the completion of the de-registration procedure.

4. Embodiments of Present Invention

The embodiments of the present invention may each be a combination of one or more of the procedures described in Chapter 3. In other words, in the embodiments of the present invention, each procedure described in Chapter 3 may be performed independently of the other procedures, or after completion of each procedure, each apparatus may initiate the appropriate other procedure.

Specifically, for example, after completion of the registration procedure, each apparatus may perform the Network Slice-Specific Authentication and Authorization procedure. For example, after completion of the Network Slice-Specific Authentication and Authorization procedure, each apparatus may perform the UE configuration update procedure or the Network-initiated de-registration procedure.

In addition, each apparatus may delete stored information based on a state transition due to each procedure. Specifically, in a case that the UE transitions to the deregistered state for the current PLMN on the 3GPP access and that the UE is not registered with the current PLMN on the non-3GPP, the UE may delete the first rejected NSSAI and the third rejected NSSAI and the fourth rejected NSSAI.

In a case that the UE transitions to the deregistered state for the current PLMN on the 3GPP access, the UE may delete the second rejected NSSAI for the 3GPP access regardless of whether the UE is in the registered state or in the deregistered state on the non-3GPP for the current PLMN.

In contrast, in a case that the UE transitions to the registered state for the current PLMN on the non-3GPP access and that the UE is not registered with the current PLMN on the 3GPP, the UE may delete the first rejected NSSAI, and the third rejected NSSAI, and the fourth rejected NSSAI. In a case that the UE transitions to the deregistered state for the current PLMN on the non-3GPP access, the UE may delete the second rejected NSSAI for the non-3GPP regardless of whether the UE is in the registered state or in the deregistered state for the current PLMN on the 3GPP.

Furthermore, in a case that the UE transitions to the deregistered state for the current PLMN on both the 3GPP access and the non-3GPP access, the UE may delete the first rejected NSSAI and the third rejected NSSAI and the fourth rejected NSSAI, and may delete a second rejected NSSAI for the 3GPP and a second rejected NSSAI for the non-3GPP.

Note that a means for the UE to transition to the deregistered state for the current PLMN on the 3GPP access or on the non-3GPP access includes a method of implicitly or locally transitioning to the deregistered state based on the transmission and/or reception of an explicit message. In this regard, the explicit message may be the registration reject message, and/or the de-registration request message, and/or the de-registration complete message.

5. Modified Examples

A program running on an apparatus according to the present invention may serve as a program that controls a Central Processing Unit (CPU) and the like to cause a computer to operate in such a manner as to realize the functions of the aforementioned embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing the functions of the embodiments according to the present invention may be recorded on a computer-readable recording medium. The functions may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In a case that with advances in semiconductor technology, a circuit integration technology appears that replaces the present integrated circuits, one or multiple aspects of the present invention are also possible to use a new integrated circuit based on the technology.

Note that the invention of the present application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope not departing from the gist of the present invention. Furthermore, in the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

REFERENCE SIGNS LIST

1 Mobile communication system
10 UE_A
30 PGW-U
32 PGW-C
35 SGW
40 MME
45 eNB
50 HSS
60 PCRF
80 Access network_A (E-UTRAN)
90 Core network_A
120 Access network_B (5G AN)
122 gNB
130 UPF
132 SMF
140 AMF 150 UDM
160 PCF
190 Core network_B

The invention claimed is:

1. A User Equipment (UE) comprising:
transmission and reception circuitry;
a controller; and
a storage, wherein
in a case that the transmission and reception circuitry receives a control message including a first rejected Network Slice Selection Assistance information (NSSAI) including a Single Network Slice Selection Assistance information (S-NSSAI) and a rejection cause value associated with the S-NSSAI, and in a case that the rejection cause value indicates that the S-NSSAI is not available due to failed or revoked Network Slice-Specific Authentication and Authorization,
the controller stores, in the storage, the S-NSSAI into a second rejected NSSAI for failed or revoked Network Slice-Specific Authentication and Authorization, and
in a case that the UE enters state 5GMM-DEREGISTERED for the current Public Land Mobile Network (PLMN) on a 3GPP access and a non-3GPP access, the controller deletes the second rejected NSSAI in the storage.

2. The UE according to claim 1, wherein the control message is a registration accept message, a registration reject message, a de-registration request message, or a configuration update command message.

3. A communication control method performed by a User Equipment (UE), the communication control method comprising:
in a case that the UE receives a control message including a first rejected Network Slice Selection Assistance information (NSSAI) including a Single Network Slice Selection Assistance information (S-NSSAI) and a rejection cause value associated with the S-NSSAI, and in a case that the rejection cause value indicates that the S-NSSAI is not available due to failed or revoked Network Slice-Specific Authentication and Authorization,
storing, in the UE, the S-NSSAI into a second rejected NSSAI for failed or revoked Network Slice-Specific Authentication and Authorization, and
in a case that the UE enters state 5GMM-DEREGISTERED for the current Public Land Mobile Network (PLMN) on a 3GPP access and a non-3GPP access, deleting the second rejected NSSAI in the storage.

* * * * *